(12) United States Patent  
Cao

(10) Patent No.: US 12,425,584 B2
(45) Date of Patent: Sep. 23, 2025

(54) DECODING, ENCODING, AND ENCODING/DECODING METHODS, APPARATUSES AND DEVICES

(71) Applicant: HANGZHOU HIKVISION DIGITAL TECHNOLOGY CO., LTD., Zhejiang (CN)

(72) Inventor: Xiaoqiang Cao, Zhejiang (CN)

(73) Assignee: HANGZHOU HIKVISION DIGITAL TECHNOLOGY CO., LTD., Zhejiang (CN)

( * ) Notice: Subject to any disclaimer, the term of this patent is extended or adjusted under 35 U.S.C. 154(b) by 0 days.

(21) Appl. No.: 17/914,322

(22) PCT Filed: Mar. 23, 2021

(86) PCT No.: PCT/CN2021/082476
§ 371 (c)(1),
(2) Date: Sep. 24, 2022

(87) PCT Pub. No.: WO2021/190518
PCT Pub. Date: Sep. 30, 2021

(65) Prior Publication Data
US 2024/0236310 A1     Jul. 11, 2024

(30) Foreign Application Priority Data
Mar. 25, 2020   (CN) .................. 202010220367.X

(51) Int. Cl.
*H04N 19/117*   (2014.01)
*H04N 19/159*   (2014.01)
(Continued)

(52) U.S. Cl.
CPC .......... *H04N 19/117* (2014.11); *H04N 19/159* (2014.11); *H04N 19/176* (2014.11);
(Continued)

(58) Field of Classification Search
CPC .. H04N 19/117; H04N 19/159; H04N 19/176; H04N 19/186; H04N 19/46; H04N 19/80
See application file for complete search history.

(56) References Cited

U.S. PATENT DOCUMENTS 10,003,805 B2    6/2018  Alshina et al.
10,939,124 B1    3/2021  Wang et al.
(Continued)

FOREIGN PATENT DOCUMENTS

CN    106256128 A    12/2016
CN    107172439 A    9/2017
(Continued)

OTHER PUBLICATIONS

Russian Patent Office, Office Action and search report Issued in the corresponding Russian Patent Application No. 2022126916/07(058778), Jun. 8, 2023 (Submitted with Machine Translation).
(Continued)

*Primary Examiner* — Jeremiah C Hallenbeck-Huber
(74) *Attorney, Agent, or Firm* — Fish & Richardson P.C.

(57) ABSTRACT

Decoding, encoding, and encoding/decoding methods, apparatuses and devices are provided. A decoding method includes: if an inter prediction filter enable flag indicates that a current block is allowed to be coded in inter prediction filter mode, and the current block satisfies inter prediction filter conditions, parsing an inter prediction filter flag of the current block from bitstream data of the current block; if the inter prediction filter flag indicates that a filter type of the current block is the inter prediction filter, obtaining a target prediction value of the current block by performing an inter prediction filter process on the current block; if the inter prediction filter flag indicates that the filter type of the current block is enhanced inter prediction filter, obtaining a
(Continued)

target prediction value of the current block by performing an enhanced inter prediction filter process on the current block.

14 Claims, 6 Drawing Sheets

(51) Int. Cl.
  *H04N 19/176* (2014.01)
  *H04N 19/186* (2014.01)
  *H04N 19/46* (2014.01)
  *H04N 19/80* (2014.01)
(52) U.S. Cl.
  CPC ........... *H04N 19/186* (2014.11); *H04N 19/46* (2014.11); *H04N 19/80* (2014.11)

(56) References Cited

U.S. PATENT DOCUMENTS

| | | | |
|---|---|---|---|
| 2006/0146191 | A1 | 7/2006 | Kim et al. |
| 2011/0249737 | A1 | 10/2011 | Joshi et al. |
| 2012/0294353 | A1* | 11/2012 | Fu ................. H04N 19/186 375/E7.126 |
| 2016/0173881 | A1 | 6/2016 | Alshina et al. |
| 2017/0163989 | A1* | 6/2017 | Zhang ................ H04N 19/61 |
| 2019/0045183 | A1 | 2/2019 | Chen et al. |
| 2019/0166368 | A1 | 5/2019 | Tanaka et al. |
| 2019/0268594 | A1 | 8/2019 | Lim et al. |
| 2019/0349592 | A1 | 11/2019 | Xu et al. |
| 2021/0021818 | A1 | 1/2021 | Lee et al. |
| 2021/0058627 | A1* | 2/2021 | Wang ................ H04N 19/159 |
| 2021/0344948 | A1 | 11/2021 | Abe et al. |
| 2022/0046239 | A1* | 2/2022 | Lin ................... H04N 19/103 |
| 2022/0070441 | A1* | 3/2022 | Xiu ................... H04N 19/103 |
| 2022/0086486 | A1* | 3/2022 | Lim ................... H04N 19/196 |
| 2022/0182614 | A1* | 6/2022 | Jang ................... H04N 19/11 |

FOREIGN PATENT DOCUMENTS

| | | |
|---|---|---|
| CN | 107896330 A | 4/2018 |
| CN | 108028931 A | 5/2018 |
| CN | 108124154 A | 6/2018 |
| CN | 109587479 A | 4/2019 |
| CN | 107896330 B | 8/2019 |
| CN | 110121884 A | 8/2019 |
| CN | 110351568 A | 10/2019 |
| CN | 110650349 A | 1/2020 |
| CN | 111083474 A | 4/2020 |
| CN | 113366852 A | 9/2021 |
| JP | 2023053378 A | 4/2023 |
| KR | 20210124213 A | 10/2021 |
| RU | 2543953 C2 | 3/2015 |
| RU | 2579688 C2 | 4/2016 |
| WO | 2019069950 A1 | 4/2019 |
| WO | 2019172705 A1 | 9/2019 |
| WO | 2019194109 A1 | 10/2019 |
| WO | 2020162535 A1 | 8/2020 |

OTHER PUBLICATIONS

Australian Patent Office, Office Action Issued in the corresponding Australian Patent Application No. 2021243003, May 18, 2023.
European Patent Office, Extended European Search Report Issued in the corresponding EP Application No. 21774886.2, Jun. 30, 2023.
Kui Fan et al, "Efficient Prediction Methods With Enhanced Spatial-Temporal Correlation for HEVC", IEEE Transactions on Circuits and Systems for Video Technology, vol. 29, No. 12, Dec. 1, 2019.
Liang Zhao et al,"CE10-related Simplification and improvement of combined intra-inter prediction mode," Joint Video Experts Team (JVET) of ITU-T SG 16 WP 3 and ISO/IEC JTC 1/SC 29/WG 11, Document : JVET-N0395_r2, Mar. 19, 2019 to Mar. 27, 2019.
Run Cha et al,"Improved Combined Inter-Intra Prediction Using Spatial-Variant Weighted Coefficient", IEEE, Jul. 11, 2011.
Benjamin Bross et al, "Versatile Video Coding (Draft 8)", Joint Video Experts Team (JVET) of ITU-T SG 16 WP 3 and ISO/IEC JTC 1/ SC 29/WGII 17th Meeting: Brussels, BE, Jan. 7, 2020 to Jan. 17, 2020, Document: JVET-Q2001-vE.
International Search Report for PCT/CN2021/082476 mailed on Jun. 15, 2021 and its English translation provided by WIPO.
Written Opinion of the International Searching Authority for PCT/CN2021/082476 mailed on Jun. 15, 2021 and its English translation provided by Google Translate.
L. Xu et al., "On Modifications of GEO", Joint Video Experts Team (JVET) of ITU-T SG 16 WP 3 and ISO/IEC JTC 1/SC 29/WG 11, 16th Meeting: Geneva, CH, Oct. 1-11, 2019, Oct. 11, 2019, all pages.
Han Huang, et al, "CE4-3: Constrain SBT for GEO mode," Joint Video Experts Team (JVET) of ITU-T SG 16 WP 3 and ISO/IEC JTC 1/SC 29/WG 11, 17th Meeting: Brussels, BE, Jan. 7-17, 2020, JVET-Q0062, all pages.
Office Action Issued in the corresponding Japanese patent Application No. 2022-557968, Nov. 13, 2023 (Submitted with Machine Translation).
Australian Patent Office, Office Action Issued in the corresponding Australian Application No. 2021243003, Sep. 12, 2023.
Andre Seixas Dias, et al., "CE10: CIIP using explicit signaling of weights (CE10-1.2)", Joint Video Experts Team (JVET) of ITU-T SG 16 WP 3 and ISO/IEC JTC 1/SC 29/WG 11, 14th Meeting: Geneva, CH, Mar. 19-27, 2019.

* cited by examiner

DECODING, ENCODING, AND ENCODING/DECODING METHODS, APPARATUSES AND DEVICES

CROSS-REFERENCE TO RELATED APPLICATIONS

This application is the national phase application of International Application No. PCT/CN2021/082476, filed on Mar. 23, 2021, which claims priority to Chinese Patent Application No. 202010220367.X filed on Mar. 25, 2020, the entire contents of which are incorporated herein by reference for all purposes.

TECHNICAL FIELD

The present application relates to the field of coding and decoding technologies, and in particular, to decoding methods, coding (i.e. encoding) methods, coding and decoding methods, apparatuses and devices.

BACKGROUND

In order to achieve the purpose of saving space, video images are transmitted after being coded, and complete video coding methods may include processes such as prediction, transform, quantification, entropy coding, and filter, where the prediction process may include intra prediction and inter prediction. The inter prediction is, using correlation in a video time domain, to predict pixels of current images based on pixels of adjacent coded images, so as to achieve the purpose of removing redundancy in the video time domain. The intra prediction is, considering strong correlation in a space domain between adjacent blocks, to predict current uncoded blocks based on surrounding reconstructed pixels as reference pixels, which is to perform only a subsequent coding process on a residual value, instead of coding an original value, so as to effectively remove redundancy in the space domain, and greatly improve compression efficiency.

Inter prediction filter and enhanced inter prediction filter are two technologies for realizing the inter prediction, which are mainly used to eliminate a discontinuity problem in a space domain between a prediction block and surrounding pixels caused by the inter prediction. However, there is no suitable solution for how to be coded in inter prediction filter mode or enhanced inter prediction filter mode to realize the inter prediction, and there are problems such as poor coding performance.

SUMMARY

In the present application, there is provided a decoding method, applied to a decoding device, and including: if an inter prediction filter enable flag indicates that a current block is allowed to be coded in inter prediction filter mode, and the current block satisfies inter prediction filter conditions, parsing an inter prediction filter flag of the current block from bitstream data of the current block; if the inter prediction filter flag indicates that a filter type of the current block is the inter prediction filter, obtaining a target prediction value of the current block by performing an inter prediction filter process on the current block; if the inter prediction filter flag indicates that the filter type of the current block is enhanced inter prediction filter, obtaining a target prediction value of the current block by performing an enhanced inter prediction filter process on the current block.

In the present application, there is provided a coding method, applied to a coding device, and including: if an inter prediction filter enable flag indicates that a current block is allowed to be coded in inter prediction filter mode, and the current block satisfies inter prediction filter conditions, coding an inter prediction filter flag of the current block in bitstream data of the current block according to a filter type of the current block, where if the filter type of the current block is the inter prediction filter, the inter prediction filter flag indicates that the filter type of the current block is the inter prediction filter; or if the filter type of the current block is enhanced inter prediction filter, the inter prediction filter flag indicates that the filter type of the current block is the enhanced inter prediction filter.

In the present application, there is provided a coding and decoding method, applied to a coding device or a decoding device, and including: if it is determined that enhanced inter prediction filter is enabled for a current block, obtaining a target prediction value of the chroma component by performing an enhanced inter prediction filter process on a chroma component of the current block; determining a target prediction value of the current block according to the target prediction value of the chroma component.

In the present application, there is provided a decoding apparatus, applied to a decoding device, and including: an acquiring module, configured to, if an inter prediction filter enable flag indicates that a current block is allowed to be coded in inter prediction filter mode, and the current block satisfies inter prediction filter conditions, parse an inter prediction filter flag of the current block from bitstream data of the current block; a processing module, configured to: if the inter prediction filter flag indicates that a filter type of the current block is the inter prediction filter, obtain a target prediction value of the current block by performing an inter prediction filter process on the current block, and if the inter prediction filter flag indicates that the filter type of the current block is enhanced inter prediction filter, obtain a target prediction value of the current block by performing an enhanced inter prediction filter process on the current block.

In the present application, there is provided a coding apparatus, applied to a coding device, and including: a coding module, configured to, if an inter prediction filter enable flag indicates that a current block is allowed to be coded in inter prediction filter mode, and the current block satisfies inter prediction filter conditions, code an inter prediction filter flag of the current block in bitstream data of the current block according to a filter type of the current block, where if the filter type of the current block is the inter prediction filter, the inter prediction filter flag indicates that the filter type of the current block is the inter prediction filter, or if the filter type of the current block is enhanced inter prediction filter, the inter prediction filter flag indicates that the filter type of the current block is the enhanced inter prediction filter; and a sending module, configured to send the bitstream data of the current block.

In the present application, there is provided a coding and decoding apparatus, applied to a coding device or a decoding device, and including: a processing module, configured to, if it is determined that enhanced inter prediction filter is enabled for a current block, obtain a target prediction value of the chroma component by performing an enhanced inter prediction filter process on a chroma component of the current block; and a determining module, configured to, determine a target prediction value of the current block according to the target prediction value of the chroma component.

In the present application, there is provided a decoding device, including a processor and a machine readable storage medium, where the machine readable storage medium stores machine executable instructions that can be executed by the processor to implement the following steps: if an inter prediction filter enable flag indicates that a current block is allowed to be coded in inter prediction filter mode, and the current block satisfies inter prediction filter conditions, parsing an inter prediction filter flag of the current block from bitstream data of the current block; if the inter prediction filter flag indicates that a filter type of the current block is the inter prediction filter, obtaining a target prediction value of the current block by performing an inter prediction filter process on the current block; and if the inter prediction filter flag indicates that the filter type of the current block is enhanced inter prediction filter, obtain a target prediction value of the current block by performing an enhanced inter prediction filter process on the current block, or if it is determined that enhanced inter prediction filter is enabled for a current block, obtaining a target prediction value of the chroma component by performing an enhanced inter prediction filter process on a chroma component of the current block; and determining a target prediction value of the current block according to the target prediction value of the chroma component.

In the present application, there is provided a coding device, including a processor and a machine readable storage medium, where the machine readable storage medium stores machine executable instructions that can be executed by the processor to implement the following steps: if an inter prediction filter enable flag indicates that a current block is allowed to be coded in inter prediction filter mode, and the current block satisfies inter prediction filter conditions, coding an inter prediction filter flag of the current block in bitstream data of the current block according to a filter type of the current block, where if the filter type of the current block is the inter prediction filter, the inter prediction filter flag indicates that the filter type of the current block is the inter prediction filter; or if the filter type of the current block is enhanced inter prediction filter, the inter prediction filter flag indicates that the filter type of the current block is the enhanced inter prediction filter, or if it is determined that enhanced inter prediction filter is enabled for a current block, obtaining a target prediction value of the chroma component by performing an enhanced inter prediction filter process on a chroma component of the current block; and determining a target prediction value of the current block according to the target prediction value of the chroma component.

As can be known from the above technical solutions, in the embodiments of the present application, flags for inter prediction filter and enhanced inter prediction filter can be decoupled, that is, an inter prediction filter enable flag indicates whether the use of inter prediction filter is allowed, and an enhanced inter prediction filter enable flag indicates whether the use of enhanced inter prediction filter is allowed, so as to effectively use the inter prediction filter or the enhanced inter prediction filter to implement inter coding, and improve coding performance without changing complexity of coding and decoding.

BRIEF DESCRIPTION OF THE DRAWINGS

FIG. TA is a diagram illustrating a video coding framework in an embodiment of the present application.

DETAILED DESCRIPTION OF THE EMBODIMENTS

The terms used in the embodiments of the present application are for the purpose of describing particular examples only, and are not intended to limit the present application. The terms determined by "a", "the" and "said" in their singular forms in the embodiments of the present application and the appended claims are also intended to include plurality, unless clearly indicated otherwise in the context. It should be understood that the term "and/or" as used herein refers to and includes any and all possible combinations of one or more of the associated listed items. It is to be understood that, although terms "first," "second," "third," and the like may be used in the embodiments of the present application to describe various information, such information should not be limited to these terms. These terms are only used to distinguish one category of information from another. For example, without departing from the scope of the present application, first information may be referred as second information; and similarly, second information may also be referred as first information. Depending on the context, the word "if" as used herein may be interpreted as "when" or "upon" or "in response to determining".

In order to make those skilled in the art better understand the technical solutions of the present application, the technical terms will be briefly described below.

Figure 1A:
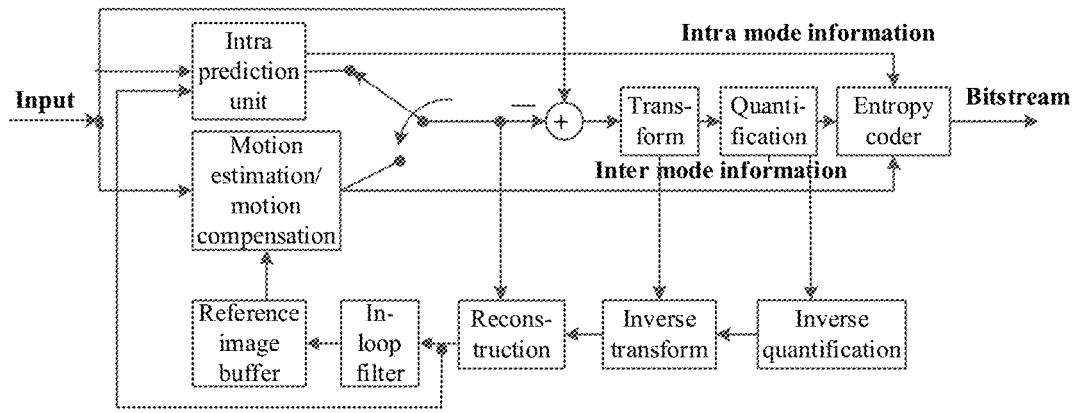
FIG. 1B is a diagram illustrating a partition tree in an embodiment of the present application.

Video Coding Framework: referring to FIG. 1A, a video coding framework can be used to implement a process flow on a coding device in the embodiments of the present application, and a diagram illustrating a video decoding framework can be similar to that in FIG. 1A, which will not be repeated here. The video decoding framework can be used to implement a process flow on a decoding device in the embodiments of the present application. The video coding framework and the video decoding framework may include, but are not limited to, a prediction module, a motion estimation/motion compensation module, a reference image buffer, an in-loop filter module, a reconstruction module, a transform module, a quantification module, an inverse transform module, an inverse quantification module, an entropy coder, and other modules. On the coding device, through cooperation between these modules, the process flow on the coding device can be implemented. On the decoding device, through cooperation between these modules, the process flow on the decoding device can be implemented.

In some examples, during video coding, a prediction process may include intra prediction and inter prediction. The intra prediction is, considering strong correlation in a space domain between adjacent blocks, to predict current uncoded blocks based on surrounding reconstructed pixels as reference pixels, which is to perform only a subsequent coding process on a residual value, instead of coding an original value, so as to effectively remove redundancy in the space domain, and greatly improve compression efficiency. In addition, the inter prediction is, using correlation in a video time domain, to predict pixels of current images based on pixels of adjacent coded images, so as to achieve the purpose of removing redundancy in the video time domain.

In some examples, during video coding, transform refers to transforming an image described in a form of pixels in a space domain into an image in a transform domain, which is expressed in a form of transform coefficients. Since most images include many flat regions and slowly changing regions, a proper transform process can transform a scattered distribution of image energy in the space domain into a relatively concentrated distribution of image energy in the transform domain. Therefore, correlation in a frequency domain between signals can be removed, and cooperating with a quantification process, a bitstream data can be effectively compressed.

In some examples, entropy coding refers to a method for lossless coding according to a principle of information entropy, and the entropy coding module, as a last processing module of video compression, transforms a series of element symbols indicating a video sequence into a binary bitstream data for transmission or storage. Input element symbols may include quantified transform coefficients, motion vector information, prediction mode information, transform and quantification related syntax, etc. Output data from the entropy coder module is a final bitstream data after an original video is compressed. The entropy coding can effectively remove redundancy in statistics of these video element symbols, and is one of important tools to ensure compression efficiency of video coding.

In some examples, loop filter is used to reduce image block artifact or poor image effect or other problems, so as to improve image quality. For example, the loop filter may include, but is not limited to, deblocking filter, Sample Adaptive Offset (SAO) filter, Adaptive Loop Filter (ALF), Cross-Component Adaptive Loop Filter (CCALF), etc.

Motion Vector (MV): during inter prediction, an MV can be used to indicate a relative displacement between a current block in a current picture of a video and a reference block in a reference picture of the video. Each partition block has a corresponding MV transmitted to a decoding device. If the MV of each block is independently coded and transmitted, especially, partitioned into a large number of small-sized blocks, a considerable number of bits will be consumed. In order to reduce the number of bits for coding the MV, correlation in a space domain between adjacent blocks can be used to predict an MV of a current to-be-coded block according to MVs of adjacent coded blocks, and then a prediction difference is coded, so that the number of bits indicating an MV can be effectively reduced. In some examples, in the process of coding an MV of a current block, MVs of adjacent coded blocks can be used to predict the MV of the current block, and then a Motion Vector Difference (MVD) between Motion Vector Prediction (MVP) and true MV estimation is coded, so that a number of bits for coding an MV can be effectively reduced.

Motion Information: since a MV indicates a displacement between a current block and a reference block, in order to accurately acquire information on the reference block, in addition to the MV, reference picture index information is needed to indicate which reference picture is used by the current block. In a video coding technology, usually, a reference picture list can be established for a current picture, and the reference picture index information indicates which reference picture in the reference picture list is used by a current block. In addition, many coding technologies support a plurality of reference picture lists. Therefore, an index value can be used to indicate which reference picture list is used, and this index value can be called a reference direction. To sum up, in the video coding technology, motion-related information such as the MV, the reference picture index information, and the reference direction can be collectively referred to as motion information.

Regular Inter Mode, Skip Mode and Direct Mode: during inter prediction, an inter prediction mode can be used to predict a current block. The inter prediction mode can include a regular inter mode, a skip mode, a direct mode, etc.

The skip mode is an inter prediction mode. A coding device is not to transmit residual information or an MVD, but is to transmit only a motion information index. A decoding device can deduce motion information on a current block by parsing the motion information index. After the motion information is acquired, the motion information is used to determine a prediction value, and the prediction value is used directly as a reconstruction value.

The direct mode is an inter prediction mode. A coding device is to transmit residual information, but is not to transmit an MVD, and is to transmit only a motion information index. A decoding device can deduce motion information on a current block by parsing the motion information index. After the motion information is acquired, the motion information is used to determine a prediction value, and the prediction value is added to a residual value to obtain a reconstruction value.

The regular inter mode is an inter prediction mode. Different from the skip mode and the direct mode, in the regular inter mode, a motion information index, an MVD, residual information and other contents that are to be transmitted are written. However, in the skip mode or the direct mode, motion information on a current block completely multiplexes motion information on an adjacent block in a time or space domain. For example, one piece of motion information can be selected as the motion information on the current block from a set of motion information on a plurality of surrounding blocks. Therefore, in the skip mode or the direct mode, only one index value is to be coded to indicate which motion information in the set of motion information is used by the current block. A difference between the skip mode and the direct mode lies in that, in the skip mode, residuals are not to be coded, but, in the direct mode, residuals are to be coded. Thus, the skip mode or the direct mode can greatly save coding overhead for motion information.

In the direct mode, how to generate an inter prediction value can be determined by using various inter prediction modes, such as a regular direct mode, a subblock mode, a Merge with Motion Vector Difference mode (MMVD), a Combine Inter Intra Prediction Mode (CIIP), a Triangular Prediction Mode (TPM), or a Geometrical Partitioning mode (GEO). The subblock mode may be an affine mode or a Subblock-based Temporal Motion Vector Prediction (SbTMVP) mode.

For the regular direct mode, one piece of motion information can be selected from a candidate motion information list, and a prediction value of a current block can be generated based on the motion information. The candidate motion information list includes: candidate motion information on adjacent blocks in a space domain, candidate motion information on adjacent blocks in a time domain, candidate motion information on no adjacent blocks in a space domain, motion information acquired by combining existing motion information, default motion information, etc. The candidate motion information list can further include motion information such as History based Motion Vector Prediction (HMVP) and/or Motion Vector Angle Prediction (MVAP), which is not limited here.

For the MMVD mode, the MMVD mode can be called an Ultimate Motion Vector Expression (UMVE) mode. Based on the candidate motion information list in the regular direct mode, motion information is selected as reference motion information from the candidate motion information list in the regular direct mode, and a motion information difference is acquired through a look-up list. Final motion information is acquired based on the reference motion information and the motion information difference, and a prediction value of a current block is generated based on the final motion information. In the MMVD/UMVE mode, displacement is performed based on a generated candidate motion, so as to obtain a better candidate motion.

For the affine mode, similar to the regular direct mode, one piece of motion information is selected from a candidate motion information list, and a prediction value of a current block is generated based on the motion information. A difference from the regular direct mode is that motion information from the candidate motion information list in the regular direct mode is a 2-parameter translation MV, but motion information from the candidate motion information list in the affine mode is 4-parameter or 6-parameter or 8-parameter affine motion information.

For the SbTMVP mode, in a time domain reference picture, motion information on a block can be directly multiplexed, and a prediction value of a current block is generated based on the motion information, where motion information on each subblock in the block can be different.

For the CIIP mode, anew prediction value of a current block is acquired by combining an intra prediction value and an inter prediction value. The CIIP mode can be called an inter prediction filter mode, that is, inter prediction filter in the text, and subsequently, will be called the inter prediction filter.

In the inter prediction filter, regarding how to acquire an inter prediction value, the inter prediction value can be acquired based on motion information in the regular direct mode, or based on motion information in the TPM/GEO mode, or based on motion information in the SbTMVP mode, which is not limited here. In the inter prediction filter, regarding how to acquire an intra prediction value, the intra prediction value can be acquired by using a Plane mode, a DC mode, an arbitrary angle mode, etc.

For the TPM, a block is partitioned into two triangular subblocks (there are 45-degree and 135-degree triangular subblocks), and these two triangular subblocks have different unidirectional motion information. The TPM is used only for a prediction process, and does not affect subsequent transform and quantification processes. Here, the unidirectional motion information is acquired directly from a candidate motion information list.

For the GEO mode, the GEO mode is similar to the TPM, but only partition shapes are different. In the GEO mode, a square block is partitioned into two subblocks with any shape (other than a shape of two triangular subblocks in the TPM), for example, one is a triangular subblock, and the other one is a pentagonal subblock; one is a triangular subblock, and the other one is a quadrilateral subblock; or both are trapezoidal subblocks, which is not limited here. The two subblocks partitioned in the GEO mode have different unidirectional motion information.

Flag Coding: in video coding, there are many modes. For a block, one of the modes may be used. In order to indicate which mode is used, each block is to be marked by coding a corresponding flag. For example, for a coding device, a value of the flag is determined through a decision of the coding device, and then the value of the flag is coded and transmitted to a decoding device. For the decoding device, it is determined whether corresponding mode is enabled by parsing the value of the flag.

During the flag coding, the flag coding can be implemented through a high-level syntax. The high-level syntax can be used to indicate whether a mode is allowed to be enabled, that is, the mode is allowed or forbidden to be enabled through the high-level syntax.

In some examples, the high-level syntax may be a Sequence Parameter Set (SPS) high-level syntax, or a Picture Parameter Set (PPS) high-level syntax, or a slice header high-level syntax, or a picture header high-level syntax, which is not limited here.

For the SPS high-level syntax, there are flags for determining whether some modes (tools/methods) are allowed to be enabled in an entire video sequence (i.e., multi-picture video images). For example, if a flag takes a value of A (such as a value of 1), a mode corresponding to the flag is allowed to be enabled in the video sequence; or if a flag takes a value of B (such as a value of 0), a mode corresponding to the flag is not allowed to be enabled in the video sequence.

For the PPS high-level syntax, there are flags for determining whether some modes (tools/methods) are allowed to be enabled in a picture (such as a video image). If a flag takes a value of A, a mode corresponding to the flag is allowed to be enabled in the video image; if a flag takes a value of B, a mode corresponding to the flag is not allowed to be enabled in the video image.

For the picture header high-level syntax, there are flags for determining whether some modes (tools/methods) are allowed to be enabled in a picture header. If a flag takes a value of A, a mode corresponding to the flag is allowed to be enabled in the picture header; if a flag takes a value of B, a mode corresponding to the flag is not allowed to be enabled in the picture header. In some examples, the picture header stores common information only for a current picture. For example, when a picture includes a plurality of slices, the plurality of slices can share information in the picture header.

For the slice header high-level syntax, there are flags for determining whether some modes (tools/methods) are allowed to be enabled in a slice. If a flag takes a value of A, a mode corresponding to the flag is allowed to be enabled in the slice; if a flag takes a value of B, a mode corresponding to the flag is not allowed to be enabled in the slice. In some examples, a picture may include one or more slices, and the slice header high-level syntax is a high-level syntax configured for each slice.

Figure 1B:
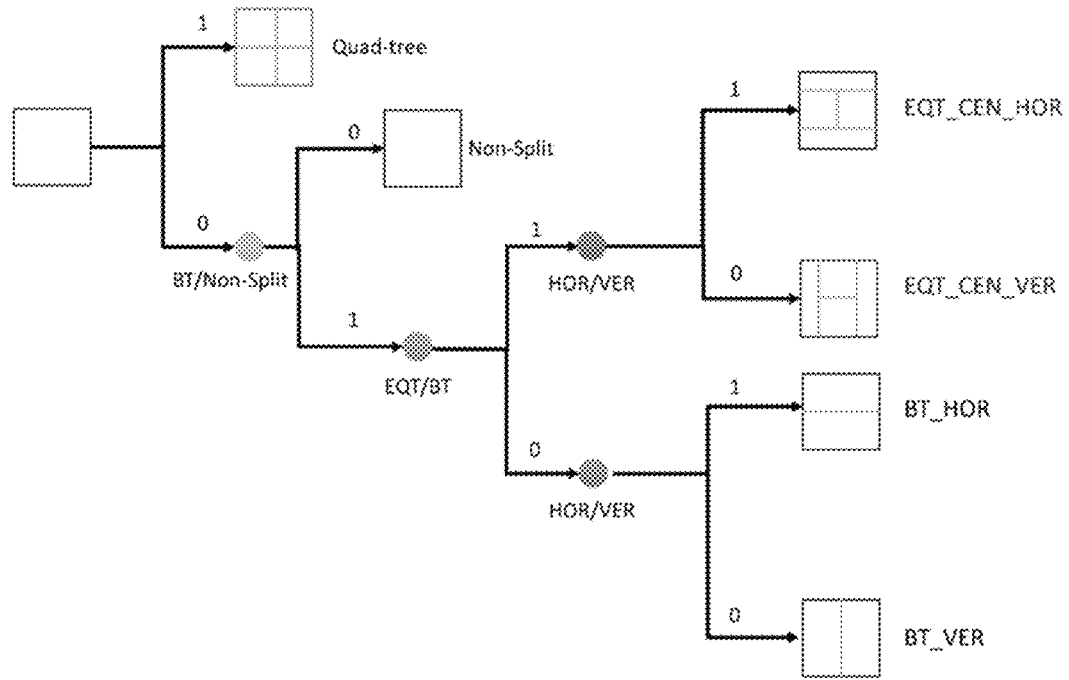

Partition Tree: referring to FIG. 1B, a current block can be partitioned by using four partition types: a Quad-tree (QT), a Binary-tree (BT), an Extended Quad-tree (EQT), and no partition (also known as non-split). Therefore, a partition tree type can be the QT, the BT, the EQT or no partition. In some examples, QT partition refers to partitioning a current block by using a QT to obtain four subblocks with a same size, where a width and a height of each subblock are half of the current block.

BT partition refers to partitioning a current block by using a BT to obtain two subblocks with a same size. The BT partition is further divided into horizontal BT partition (BT_HOR) and vertical BT partition (BT_VER). In a case of the BT_HOR, the current block is horizontally partitioned into two subblocks, where a width of each subblock is the same as a width of the current block, and a height of each subblock is half of a height of the current block. In a case of the BT_VER, the current block is vertically partitioned into two subblocks, where a width of each subblock is half of a width of the current block, and a height of each subblock is the same as a height of the current block.

EQT partition refers to partitioning a current block by using a QT to obtain four subblocks, but sizes of the four subblocks are not completely same. The EQT partition is further divided into horizontally extended QT partition (EQT_HOR) and vertically extended QT partition (EQT_VER). In a case of the EQT_HOR, a current block with a size of M*N is partitioned into two subblocks with a size of M*(N/4) and two subblocks with a size of (M/2)*(N/2). In a case of the EQT_VER, a current block with a size of M*N is partitioned into two subblocks with a size of (M/4)*N and two subblocks with a size of (M/2)*(N/2).

In consideration of hardware implementation, for chroma components of 2*N and N*2, costs for the hardware implementation is higher. Therefore, in partitioning, blocks with chroma components of 2*N and N*2 are avoided. When a partition type (QT, BT or EQT) is used for a block, a chroma component of 2*N or N*2 will be generated, and a luma component of this block will continue to be partitioned, so as to generate several luma subcomponents, but the chroma component will not be partitioned, so as to generate one chroma component. In this case, a partition tree type in luma components is inconsistent with a partition tree type in chroma components, that is, the partition tree type in luma components is QT, BT or EQT, and the partition tree type in chroma components is no partition.

Rate-Distortion Optimized (RDO): there are two major indicators for evaluating coding efficiency: a code rate and a Peak Signal to Noise Ratio (PSNR). The smaller a bitstream is, the larger a compression rate is. The larger a PSNR is, the better a reconstructed image quality is. In mode selection, a discriminant formula is essentially a comprehensive evaluation on the two indicators. For example, a cost corresponding to a mode is: $J(mode)=D+\lambda*R$, where D represents distortion, which usually can be measured with an SSE indicator, where SSE refers to a mean square sum of differences between reconstructed image blocks and a source image; $\lambda$ is a Lagrangian multiplier; R is an actual number of bits required for image block coding in this mode, including a sum of bits required for coding mode information, motion information, residuals, etc. In mode selection, if an RDO is used to make comparison decisions on coding modes, best coding performance can be usually guaranteed.

In the related art, technologies for realizing inter prediction, such as inter prediction filter and enhanced inter prediction filter, are proposed to eliminate a discontinuity problem in a space domain between a prediction block and surrounding pixels caused by the inter prediction. However, the enhanced inter prediction filter is used only for luma components, and not for chroma components, resulting in that the discontinuity problem in a space domain between a prediction block and surrounding pixels still exists in the chroma components, and coding performance is poor. In addition, whether the inter prediction filter and the enhanced inter prediction filter are enabled is indicated by a high-level syntax, that is, enabling the inter prediction filter and the enhanced inter prediction filter are simultaneously controlled by high-level syntax, or disabling the inter prediction filter and the enhanced inter prediction filter are simultaneously controlled by a high-level syntax, which cannot realize separate control over the inter prediction filter and the enhanced inter prediction filter, and cannot support more flexible selection, resulting in poor coding performance.

In response to the above findings, in a possible implementation manner, inter prediction filter and enhanced inter prediction filter can be controlled separately, that is, whether the inter prediction filter is enabled (such as enabling or disabling the inter prediction filter) is indicated by a high-level syntax, and whether the enhanced inter prediction filter is enabled (such as enabling or disabling the enhanced inter prediction filter) is indicated by another high-level syntax, so as to support more flexible selection and improve coding performance.

In another possible implementation manner, enhanced inter prediction filter can be used to process chroma components, that is, enhanced inter prediction filter is used to process luma components and chroma components, so as to eliminate a discontinuity problem in a space domain between a prediction block and surrounding pixels caused by inter prediction, for example, eliminate a discontinuity problem in a space domain in chroma components, and improve coding performance.

In another possible implementation manner, inter prediction filter and enhanced inter prediction filter can be controlled separately, that is, whether the inter prediction filter is enabled (such as enabling or disabling the inter prediction filter) is indicated by a high-level syntax, and whether the enhanced inter prediction filter is enabled (such as enabling or disabling the enhanced inter prediction filter) is indicated by another high-level syntax, so as to support more flexible selection and improve coding performance. Further, in enabling the enhanced inter prediction filter, the enhanced inter prediction filter can be used to process chroma components, that is, the enhanced inter prediction filter is used to process luma components and chroma components, so as to eliminate a discontinuity problem in a space domain between a prediction block and surrounding pixels caused by inter prediction, for example, eliminate a discontinuity problem in a space domain in chroma components, and improve coding performance.

In some examples, inter prediction filter and enhanced inter prediction filter in the embodiments of the present application can be filter technologies for an inter prediction process, rather than loop filter in FIG. TA (such as deblocking filter, SAO filter, ALF filter, and CCALF filter). The inter prediction filter refers to using an inter prediction filter technology to filter inter prediction values in the inter prediction process. The inter prediction filter can be called Unite Direct and Intra Mode Prediction (UDIP). The enhanced inter prediction filter refers to using an enhanced inter prediction filter technology to filter inter prediction values in the inter prediction process. The enhanced inter prediction filter can be called Enhance Unite Direct and Intra Mode Prediction (EUDIP).

A decoding method and a coding method in the embodiments of the present application will be described below with reference to several specific embodiments.

Figure 2A:
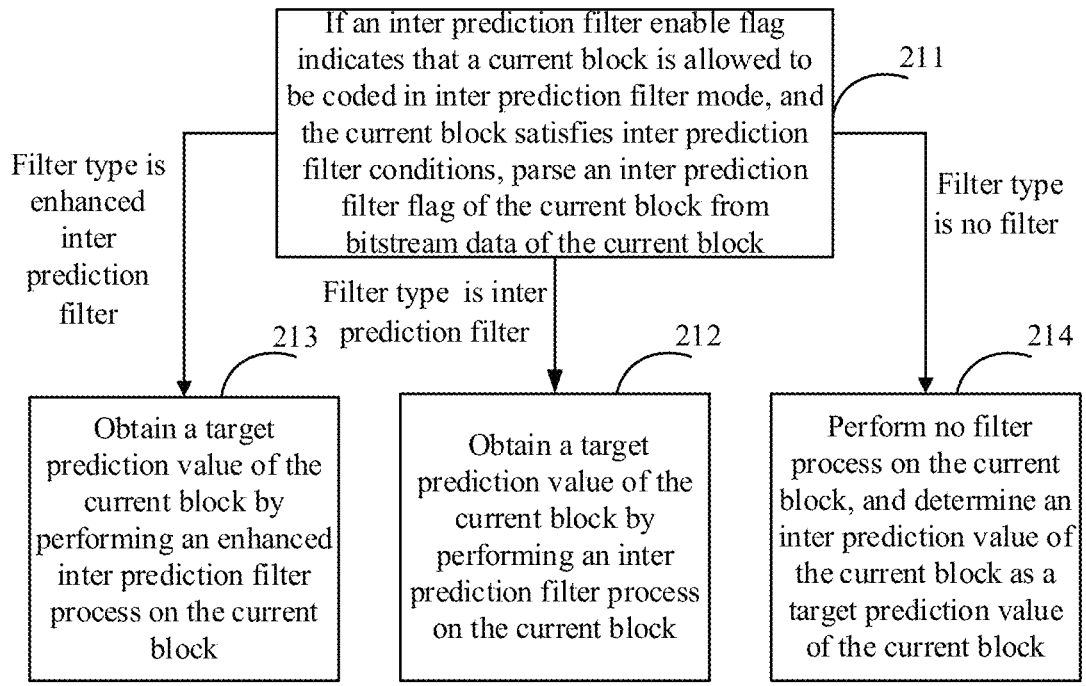
FIG. 2A is a flowchart illustrating a decoding method in an embodiment of the present application.

Embodiment 1: FIG. 2A is a flowchart illustrating a decoding method. The method can be applied to a decoding device, and includes:

At step 211, if an inter prediction filter enable flag indicates that a current block is allowed to be coded in inter prediction filter mode, and the current block satisfies inter prediction filter conditions, an inter prediction filter flag of the current block is parsed from bitstream data of the current block.

In some examples, if an inter prediction filter enable flag indicates that a current block is allowed to be coded in inter prediction filter mode, and the current block satisfies inter prediction filter conditions, an inter prediction filter flag of the current block is parsed from bitstream data of the current block.

In some examples, if an inter prediction filter flag indicates that a filter type of a current block is inter prediction filter, step 212 is performed; if the inter prediction filter flag indicates that the filter type of the current block is enhanced inter prediction filter, step 213 is performed; if the inter prediction filter flag indicates that the filter type of the current block is no filter, step 214 is performed.

Based on this, before step 211, the inter prediction filter enable flag can be first parsed from the bitstream data (that is, the bitstream data of a high-level syntax), and the inter prediction filter enable flag indicates that the current block is allowed to be coded in inter prediction filter mode, or the current block is not allowed to be coded in inter prediction filter mode.

If the inter prediction filter enable flag indicates that the current block is allowed to be coded in inter prediction filter mode, it is determined whether the current block satisfies the inter prediction filter conditions.

If the current block does not satisfy the inter prediction filter conditions, it is forbidden to parse the inter prediction filter flag of the current block from the bitstream data of the current block, that is, neither inter prediction filter process nor enhanced inter prediction filter process is performed on the current block.

If the current block satisfies the inter prediction filter conditions, the inter prediction filter flag of the current block is parsed from the bitstream data of the current block, a filter type of the current block is determined according to the inter prediction filter flag and corresponding processing is performed.

In some examples, a current block satisfies inter prediction filter conditions, which includes, but is not limited to, if an inter prediction mode of the current block is a direct mode, and/or the current block satisfies a size restriction condition, it is determined that the current block satisfies the inter prediction filter conditions.

In some examples, after an inter prediction filter flag of a current block is parsed from bitstream data of the current block, a filter type of the current block can be determined according to the inter prediction filter flag. For example, if an inter prediction filter enable flag indicates that the current block is allowed to be coded in inter prediction filter mode, when the inter prediction filter flag takes a first value, the inter prediction filter flag indicates that the filter type of the current block is no filter, that is, it is determined that the filter type of the current block is no filter; when the inter prediction filter flag takes a second value, the inter prediction filter flag indicates that the filter type of the current block is the inter prediction filter, that is, it is determined that the filter type of the current block is the inter prediction filter; when the inter prediction filter flag takes a third value, the inter prediction filter flag indicates that the filter type of the current block is enhanced inter prediction filter, that is, it is determined that the filter type of the current block is the enhanced inter prediction filter.

The first value, the second value, and the third value can be set according to experience, and are not limited here. For example, the first value can be 0, the second value can be 10, and the third value can be 11. The above values are just examples.

At step 212, a target prediction value of the current block is obtained by performing an inter prediction filter process on the current block.

In some examples, when an inter prediction filter process is performed on a current block, an inter prediction value of the current block and an intra prediction value of the current block can be acquired, and a target prediction value of the current block is determined according to the inter prediction value and the intra prediction value.

In a possible implementation manner, a current block includes a luma component and a chroma component, and a target prediction value of the luma component can be obtained by performing an inter prediction filter process on the luma component; or a target prediction value of the chroma component can be obtained by performing an inter prediction filter process on the chroma component; or a target prediction value of the luma component can be obtained by performing an inter prediction filter process on the luma component, and a target prediction value of the chroma component can be obtained by performing an inter prediction filter process on the chroma component.

At step 213, a target prediction value of the current block is obtained by performing an enhanced inter prediction filter process on the current block.

In some examples, when an enhanced inter prediction filter process is performed on a current block, an inter prediction value of the current block and a reconstruction value of reconstructed pixels adjacent to the current block (such as a reconstruction value of reconstructed pixels in a left column outside the current block, and/or a reconstruction value of reconstructed pixels in an upper row outside the current block) can be acquired, and a target prediction value of the current block is determined according to the inter prediction value and the reconstruction value.

In a possible implementation manner, a current block includes a luma component and a chroma component, and a target prediction value of the luma component can be obtained by performing an enhanced inter prediction filter process on the luma component; or a target prediction value of the chroma component can be obtained by performing an enhanced inter prediction filter process on the chroma component; or a target prediction value of the luma component can be obtained by performing an enhanced inter prediction filter process on the luma component, and a target prediction value of the chroma component can be obtained by performing an enhanced inter prediction filter process on the chroma component.

In some examples, a target prediction value of the chroma component is obtained by performing an enhanced inter prediction filter process on a chroma component, which can include, but is not limited to, an inter prediction value of the chroma component and a chroma reconstruction value of reconstructed pixels adjacent to the chroma component are acquired, and the target prediction value of the chroma component is determined according to the inter prediction value of the chroma component and the chroma reconstruction value.

In some examples, a target prediction value of the luma component is obtained by performing an enhanced inter prediction filter process on a luma component, which can include, but is not limited to, an inter prediction value of the luma component and a luma reconstruction value of reconstructed pixels adjacent to the luma component are acquired, and the target prediction value of the luma component is determined according to the inter prediction value of the luma component and the luma reconstruction value.

In a possible implementation manner, a target prediction value of the chroma component is obtained by performing an enhanced inter prediction filter process on a chroma component, which can include: if the chroma component satisfies enhanced inter prediction filter conditions, the target prediction value of the chroma component is obtained by performing the enhanced inter prediction filter process on the chroma component. Further, the chroma component satisfies the enhanced inter prediction filter conditions, which can include, but is not limited to, the chroma component belongs to the same partition tree type as a luma component.

At step 214, no filter process is performed on the current block, and an inter prediction value of the current block is determined as a target prediction value of the current block.

In some examples, when no filter process is performed on a current block, an inter prediction value of the current block can be acquired, and the inter prediction value of the current block can be determined as a target prediction value of the current block, but no filter process is to be performed on the inter prediction value.

Figure 2B:
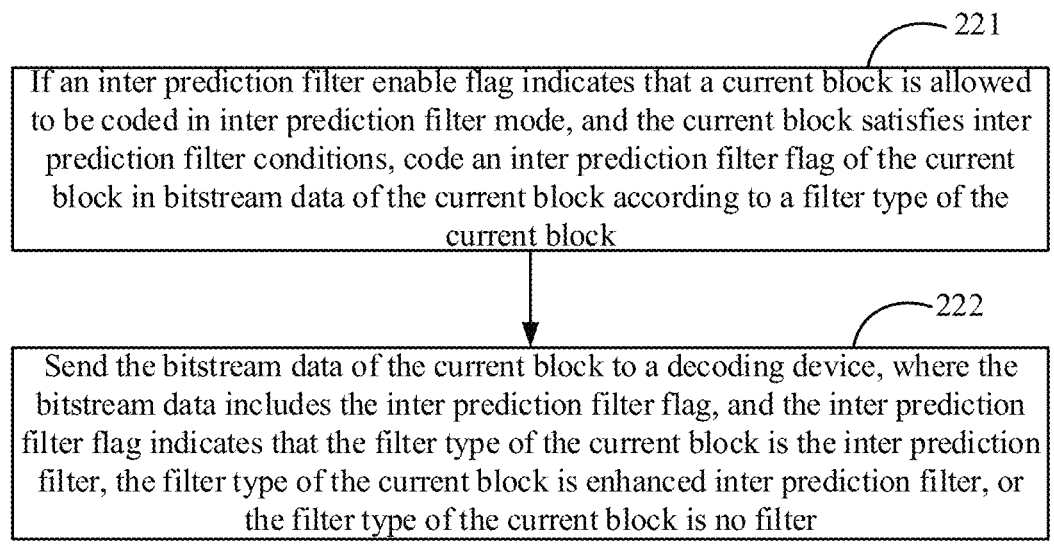
FIG. 2B is a flowchart illustrating a coding method in an embodiment of the present application.

Embodiment 2: FIG. 2B is a flowchart illustrating a coding method. The method can be applied to a coding device, and includes:

At step 221, if an inter prediction filter enable flag indicates that a current block is allowed to be coded in inter prediction filter mode, and the current block satisfies inter prediction filter conditions, an inter prediction filter flag of the current block is coded with bitstream data of the current block according to a filter type of the current block.

In some examples, if an inter prediction filter enable flag indicates that a current block is allowed to be coded in inter prediction filter mode, and the current block satisfies inter prediction filter conditions, an inter prediction filter flag is coded with bitstream data of the current block according to a filter type of the current block.

In some examples, if a filter type of a current block is inter prediction filter, an inter prediction filter flag indicates that the filter type of the current block is the inter prediction filter; if a filter type of a current block is enhanced inter prediction filter, an inter prediction filter flag indicates that the filter type of the current block is the enhanced inter prediction filter; or if a filter type of a current block is no filter, an inter prediction filter flag indicates that the filter type of the current block is no filter.

Based on this, before step 221, the coding device can first code the inter prediction filter enable flag in the bitstream data (that is, a bitstream data of a high-level syntax), and the inter prediction filter enable flag indicates that the current block is allowed to be coded in inter prediction filter mode, or the current block is not allowed to be coded in inter prediction filter mode.

If the inter prediction filter enable flag indicates that the current block is allowed to be coded in inter prediction filter mode, it is determined whether the current block satisfies the inter prediction filter conditions.

If the current block does not satisfy the inter prediction filter conditions, it is forbidden to code the inter prediction filter flag of the current block in the bitstream data of the current block, that is, neither inter prediction filter process nor enhanced inter prediction filter process is performed on the current block.

If the current block satisfies the inter prediction filter conditions, the inter prediction filter flag of the current block is coded with the bitstream data of the current block, for example, the inter prediction filter flag of the current block is coded with the bitstream data of the current block according to the filter type of the current block.

In some examples, a current block satisfies inter prediction filter conditions, which can include, but is not limited to, if an inter prediction mode of the current block is a direct mode, and/or the current block satisfies a size restriction condition, it is determined that the current block satisfies the inter prediction filter conditions.

In some examples, an inter prediction filter flag of a current block is coded with bitstream data of the current block according to a filter type of the current block, which can include, but is not limited to, if an inter prediction enable flag indicates that the current block is allowed to be coded in inter prediction filter mode, when the filter type of the current block is no filter, a coding device codes the inter prediction filter flag as a first value in the bitstream data of the current block, and the inter prediction filter flag indicates that the filter type of the current block is no filter; when the filter type of the current block is the inter prediction filter, the coding device codes the inter prediction filter flag as a second value in the bitstream data of the current block, and the inter prediction filter flag indicates that the filter type of the current block is the inter prediction filter; when the filter type of the current block is enhanced inter prediction filter, the coding device codes the inter prediction filter flag as a third value in the bitstream data of the current block, and the inter prediction filter flag indicates that the filter type of the current block is the enhanced inter prediction filter. The first value, the second value, and the third value can be set according to experience, and are not limited here. For example, the first value can be 0, the second value can be 10, and the third value can be 11.

In a possible implementation manner, before coding an inter prediction filter flag of a current block in bitstream data of the current block according to a filter type of the current block, the filter type of the current block can be determined in the following manner: a first target prediction value of the current block is obtained by performing an inter prediction filter process on the current block; a second target prediction value of the current block is obtained by performing an enhanced inter prediction filter process on the current block; no filter process is performed on the current block, and an inter prediction value of the current block is determined as a third target prediction value of the current block. Further, the filter type of the current block can be determined according to a rate-distortion cost value corresponding to the first target prediction value, a rate-distortion cost value corresponding to the second target prediction value, and a rate-distortion cost value corresponding to the third target prediction value.

For example, if the rate-distortion cost value corresponding to the first target prediction value is a smallest rate-distortion cost value, it can be determined that the filter type of the current block is inter prediction filter. If the rate-distortion cost value corresponding to the second target prediction value is a smallest rate-distortion cost value, it can be determined that the filter type of the current block is enhanced inter prediction filter. If the rate-distortion cost value corresponding to the third target prediction value is a smallest rate-distortion cost value, it can be determined that the filter type of the current block is no filter.

In some examples, when an inter prediction filter process is performed on a current block, an inter prediction value of the current block and an intra prediction value of the current block can be acquired, and a first target prediction value of the current block can be determined according to the inter prediction value and the intra prediction value.

For example, a current block includes a luma component and a chroma component, and a first target prediction value of the luma component can be obtained by performing an inter prediction filter process on the luma component; a first target prediction value of the chroma component can be obtained by performing an inter prediction filter process on the chroma component; or a first target prediction value of the luma component can be obtained by performing an inter prediction filter process on the luma component, and a first target prediction value of the chroma component can be obtained by performing an inter prediction filter process on the chroma component.

In some examples, when an enhanced inter prediction filter process is performed on a current block, an inter prediction value of the current block and a reconstruction value of reconstructed pixels adjacent to the current block (such as a reconstruction value of reconstructed pixels in a left column outside the current block, and/or a reconstruction value of reconstructed pixels in an upper row outside the current block) can be acquired, and a second target prediction value of the current block is determined according to the inter prediction value and the reconstruction value.

For example, a current block includes a luma component and a chroma component, and a second target prediction value of the luma component can be obtained by performing an enhanced inter prediction filter process on the luma component; or a second target prediction value of the chroma component can be obtained by performing an enhanced inter prediction filter process on the chroma component; or a second target prediction value of the luma component can be obtained by performing an enhanced inter prediction filter process on the luma component, and a second target prediction value of the chroma component can be obtained by performing an enhanced inter prediction filter process on the chroma component.

A second target prediction value of the chroma component is obtained by performing an enhanced inter prediction filter process on a chroma component, which can include, but is not limited to, an inter prediction value of the chroma component and a chroma reconstruction value of reconstructed pixels adjacent to the chroma component are acquired, and the second target prediction value of the chroma component is determined according to the inter prediction value of the chroma component and the chroma reconstruction value.

A second target prediction value of the luma component is obtained by performing an enhanced inter prediction filter process on a luma component, which can include, but is not limited to, an inter prediction value of the luma component and a luma reconstruction value of reconstructed pixels adjacent to the luma component are acquired, and the second target prediction value of the luma component is determined according to the inter prediction value of the luma component and the luma reconstruction value.

A second target prediction value of the chroma component is obtained by performing an enhanced inter prediction filter process on a chroma component, which can include, but is not limited to the following manner: if the chroma component satisfies enhanced inter prediction filter conditions, the second target prediction value of the chroma component is obtained by performing the enhanced inter prediction filter process on the chroma component. Further, the chroma component satisfies the enhanced inter prediction filter conditions, which can include, but is not limited to, the chroma component belongs to the same partition tree type as a luma component.

In some examples, when no filter process is performed on a current block, an inter prediction value of the current block can be acquired, and the inter prediction value of the current block can be determined as a third target prediction value of the current block, but no filter process is to be performed on the inter prediction value.

At step 222, the bitstream data of the current block is sent to a decoding device, where the bitstream data includes the inter prediction filter flag, and the inter prediction filter flag indicates that the filter type of the current block is the inter prediction filter, the filter type of the current block is enhanced inter prediction filter, or the filter type of the current block is no filter.

Figure 2C:
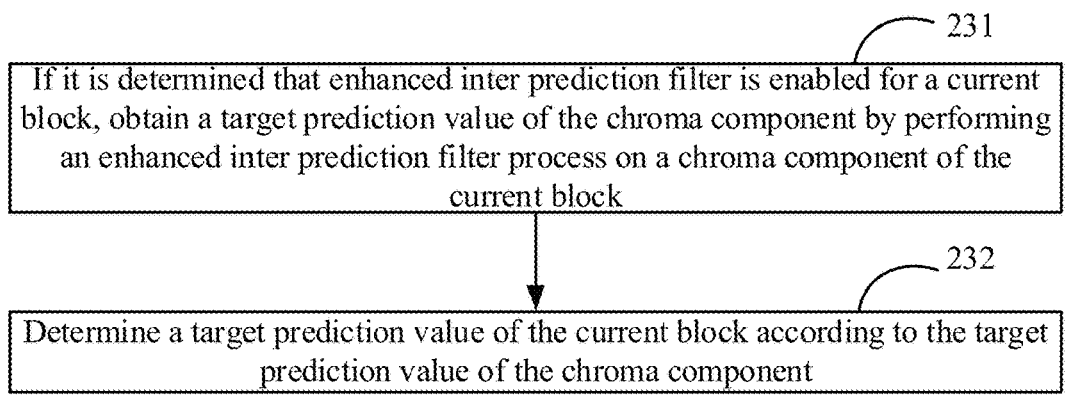
FIG. 2C is a flowchart illustrating a coding and decoding method in an embodiment of the present application.

Embodiment 3: FIG. 2C is a flowchart illustrating a coding and decoding method. The method can be applied to a coding device or a decoding device. The coding device realizes a coding process according to the method, and the decoding device realizes a decoding process according to the method. The method can include:

At step 231, if it is determined that enhanced inter prediction filter is enabled for a current block, a target prediction value of the chroma component is obtained by performing an enhanced inter prediction filter process on a chroma component of the current block.

At step 232, a target prediction value of the current block is determined according to the target prediction value of the chroma component.

In some examples, a current block includes a luma component and a chroma component, and if it is determined that enhanced inter prediction filter is enabled for the current block, a target prediction value of the chroma component is obtained by performing an enhanced inter prediction filter process on the chroma component of the current block, and a target prediction value of the current block is determined according to the target prediction value of the chroma component, or a target prediction value of the chroma component is obtained by performing an enhanced inter prediction filter process on the chroma component of the current block, a target prediction value of the luma component is obtained by performing an enhanced inter prediction filter process on the luma component of the current block, and a target prediction value of the current block is determined according to the target prediction value of the chroma component and the target prediction value of the luma component.

In some examples, a target prediction value of the chroma component is obtained by performing an enhanced inter prediction filter process on a chroma component, which can include, but is not limited to, an inter prediction value of the chroma component and a chroma reconstruction value of reconstructed pixels adjacent to the chroma component are acquired, and the target prediction value of the chroma component is determined according to the inter prediction value of the chroma component and the chroma reconstruction value.

In some examples, a target prediction value of the luma component is obtained by performing an enhanced inter prediction filter process on a luma component, which can include, but is not limited to, an inter prediction value of the luma component and a luma reconstruction value of reconstructed pixels adjacent to the luma component are acquired, and the target prediction value of the luma component is determined according to the inter prediction value of the luma component and the luma reconstruction value.

In some examples, a target prediction value of the chroma component is obtained by performing an enhanced inter prediction filter process on a chroma component, which can include, but is not limited to, if the chroma component satisfies enhanced inter prediction filter conditions, the target prediction value of the chroma component is obtained by performing the enhanced inter prediction filter process on the chroma component. Further, the chroma component satisfies the enhanced inter prediction filter conditions, which can include, but is not limited to, the chroma component belongs to the same partition tree type as a luma component.

Based on the above technical solutions, in the embodiments of the present application, enhanced inter prediction filter can be used to process chroma components, that is, enhanced inter prediction filter is used to process luma components and chroma components, so as to eliminate a discontinuity problem in a space domain between a prediction block and surrounding pixels caused by inter prediction, for example, eliminate a discontinuity problem in a space domain in chroma components, and improve coding performance.

Embodiment 4: a coding device can first acquire a high-level syntax, and the high-level syntax can include an inter prediction filter enable flag. Methods for the acquisition are not limited, as long as the inter prediction filter enable flag can be obtained. The inter prediction filter enable flag can be an SPS flag, or a PPS flag, or a slice header flag, or a picture header flag. Types of the high-level syntax for the flag are not limited.

The inter prediction filter enable flag indicates that the use of inter prediction filter is allowed, or the use of inter prediction filter is not allowed. For example, when the inter prediction filter enable flag takes a value of A (such as a value of 1), the use of inter prediction filter is allowed; when the inter prediction filter enable flag takes a value of B (such as a value of 0), the use of inter prediction filter is not allowed.

In some examples, if an inter prediction filter enable flag indicates that the use of inter prediction filter is allowed, when a coding/decoding device process(es) a current block, it is determined through the inter prediction filter enable flag that the current block is allowed to be coded in inter prediction filter mode. If the inter prediction filter enable flag indicates that the use of inter prediction filter is not allowed, when the current block is processed, it is determined through the inter prediction filter enable flag that the current block is not allowed to be coded in inter prediction filter mode.

To sum up, the coding/decoding device can learn through the inter prediction filter enable flag that the current block is allowed to be coded in inter prediction filter mode, or the current block is not allowed to be coded in inter prediction filter mode.

Figure 3:
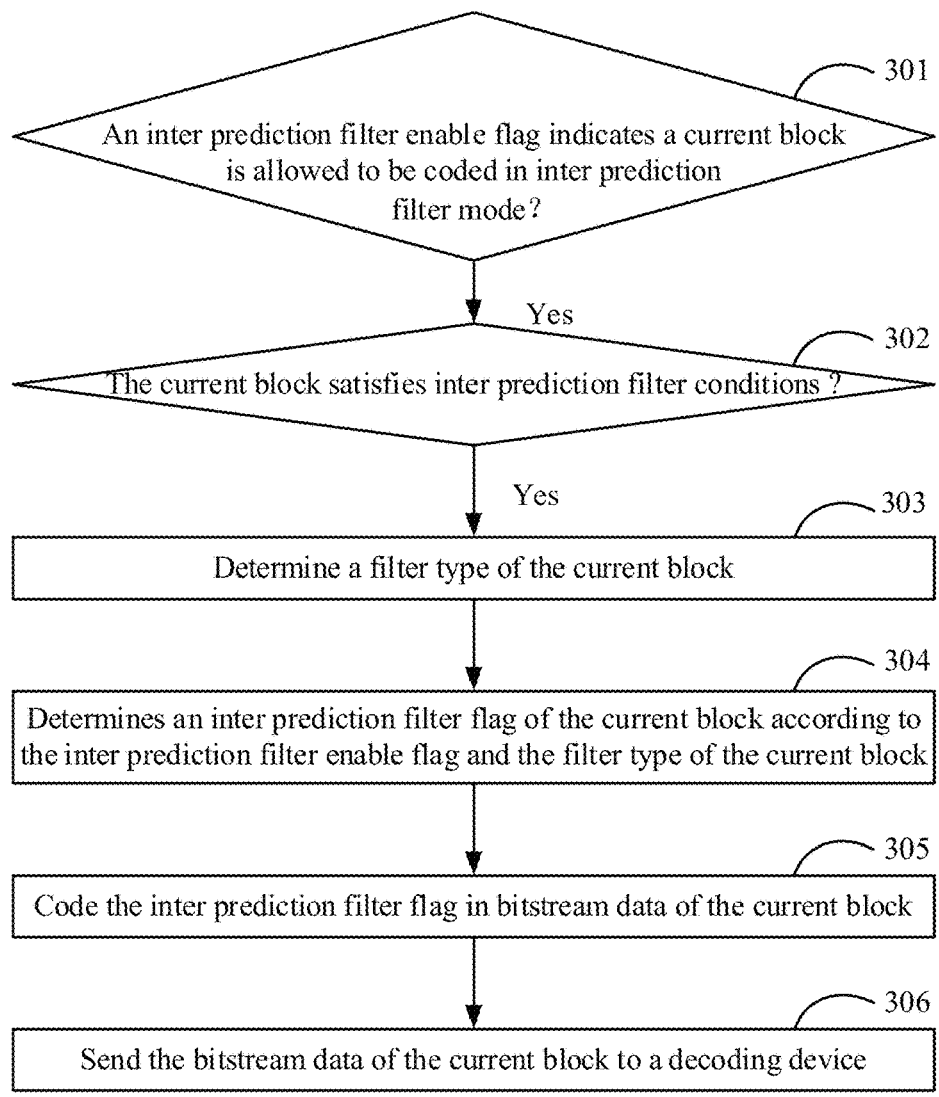
FIG. 3 is a flowchart illustrating a coding and decoding method in another embodiment of the present application.

Based on the above process, referring to FIG. 3, a coding and decoding method provided in the embodiments of the present application can include:

At step 301, a coding device determines an inter prediction filter enable flag indicates whether a current block is allowed to be coded in inter prediction filter mode.

If the inter prediction filter enable flag indicates that the current block is not allowed to be coded in inter prediction filter mode, it is forbidden to code an inter prediction filter flag of the current block in bitstream data of the current block, that is, neither inter prediction filter process nor enhanced inter prediction filter process is performed on the current block.

If the inter prediction filter enable flag indicates that the current block is allowed to be coded in inter prediction filter mode, step 302 is performed.

At step 302, the coding device determines whether the current block satisfies inter prediction filter conditions.

If the current block does not satisfy the inter prediction filter conditions, it is forbidden to code the inter prediction filter flag of the current block in the bitstream data of the current block, that is, neither inter prediction filter process nor enhanced inter prediction filter process is performed on the current block.

If the current block satisfies the inter prediction filter conditions, step 303 is performed.

A process of determining that the current block satisfies the inter prediction filter conditions can include, but is not limited to, if an inter prediction mode of the current block is a direct mode, and/or the current block satisfies a size restriction condition, it is determined that the current block satisfies the inter prediction filter conditions.

In a possible implementation manner, inter prediction modes can include, but are not limited to, a regular inter mode, a skip mode, a direct mode, etc. Based on this, if an inter prediction mode of a current block is the direct mode, it can be determined that the current block satisfies inter prediction filter conditions, and otherwise, it is determined that the current block does not satisfy the inter prediction filter conditions; or if an inter prediction mode of a current block is neither the regular inter mode nor the skip mode, it can be determined that the current block satisfies the inter prediction filter conditions, and if the inter prediction mode of the current block is the regular inter mode or the skip mode, it is determined that the current block does not satisfy the inter prediction filter conditions.

In some examples, a direct mode can include, but is not limited to, a regular direct mode, an affine mode, an SbTMVP mode, a UMVE mode, an inter prediction filter mode, a TPM mode, a GEO mode, etc. Based on this, if an inter prediction mode of a current block is the inter prediction filter mode in the direct mode, it can be determined that the current block satisfies inter prediction filter conditions, and if the inter prediction mode of the current block is not the inter prediction filter mode in the direct mode, it can be determined that the current block does not satisfy the inter prediction filter conditions; or if an inter prediction mode of a current block is neither the UMVE mode nor the affine mode in the direct mode, it can be determined that the current block satisfies inter prediction filter conditions, and if the inter prediction mode of the current block is the UMVE mode or the affine mode in the direct mode, it can be determined that the current block does not satisfy the inter prediction filter conditions.

In another possible implementation manner, if a current block satisfies a size restriction condition, it is determined that the current block satisfies inter prediction filter conditions, and if the current block does not satisfy the size restriction condition, it is determined that the current block does not satisfy the inter prediction filter conditions.

The current block satisfies the size restriction condition, which can include, but is not limited to, a width of the current block is less than or equal to a first value (which can be set according to experience, and is not limited here, such as 64 or 128), a height of the current block is less than or equal to a second value (which can be set according to experience, and is not limited here, such as 64 or 128), and an area of the current block is greater than or equal to a third value (which can be set according to experience, and is not limited here, such as 64 or 128). The above are just examples, which are not limited here.

For example, if the width of the current block is less than or equal to 64, the height of the current block is less than or equal to 64, and the area (i.e., width*height) of the current block is greater than or equal to 64, it can be determined that the current block satisfies the size restriction condition.

In another possible implementation manner, if an inter prediction mode of a current block is a direct mode (such as an inter prediction filter mode in the direct mode), and the current block satisfies a size restriction condition, it is determined that the current block satisfies inter prediction filter conditions.

At step 303, the coding device determines a filter type of the current block. The filter type of the current block can be no filter, the filter type of the current block can be inter prediction filter, or the filter type of the current block can be enhanced inter prediction filter.

For a specific method for determining the filter type of the current block, reference may be made to Embodiment 2, which will not be repeated here.

In some examples, a current block can include a luma component and a chroma component, and when an enhanced inter prediction filter process is performed on the current block, a second target prediction value of the luma component can be obtained by performing an enhanced inter prediction filter process on the luma component; or a second target prediction value of the chroma component can be obtained by performing an enhanced inter prediction filter process on the chroma component; or to obtain a second target prediction value of the luma component can be obtained by performing an enhanced inter prediction filter process on the luma component, and a second target prediction value of the chroma component can be obtained by performing an enhanced inter prediction filter process on the chroma component.

In some examples, when an enhanced inter prediction filter process is performed on a chroma component, if the chroma component satisfies enhanced inter prediction filter conditions, the enhanced inter prediction filter process can be performed on the chroma component; if the chroma component does not satisfy the enhanced inter prediction filter conditions, it is forbidden to perform the enhanced inter prediction filter process on the chroma component. Further, the chroma component satisfies the enhanced inter prediction filter conditions, which can include, but is not limited to, the chroma component belongs to the same partition tree type as a luma component.

In a possible implementation manner, if a chroma component belongs to the same partition tree type as a luma component, it is determined that the chroma component satisfies enhanced inter prediction filter conditions, and if the chroma component belongs to different partition tree types from the luma component, it is determined that the chroma component does not satisfy the enhanced inter prediction filter conditions.

In some examples, if at least one of the following conditions is satisfied, it is determined that a chroma component belongs to different partition tree types from a luma component, and otherwise, it is determined that the chroma component belongs to the same partition tree type as the luma component:

a current block is of a QT partition type, and a width or a height of the current block is equal to a preset value of A (such as 8);

a current block is of a BT_VER partition type, and a width of the current block is equal to a preset value of B (such as 8);

a current block is of a BT_HOR partition type, and a height of the current block is equal to a preset value of C (such as 8);

a current block is of an EQT_VER partition type, and a width of the current block is equal to a preset value of D (such as 16);

a current block is of an EQT_VER partition type, and a height of the current block is equal to a preset value of E (such as 8);

a current block is of an EQT_HOR partition type, and a height of the current block is equal to a preset value of F (such as 16); or a current block is of an EQT_HOR partition type, and a width of the current block is equal to a preset value of G (such as 8).

At step 304, the coding device determines an inter prediction filter flag of the current block according to the inter prediction filter enable flag and the filter type of the current block.

If the filter type of the current block is the inter prediction filter, the inter prediction filter flag indicates that the filter type of the current block is the inter prediction filter; if the filter type of the current block is enhanced inter prediction filter, the inter prediction filter flag indicates that the filter type of the current block is the enhanced inter prediction filter; if the filter type of the current block is no filter, the inter prediction filter flag indicates that the filter type of the current block is no filter.

At step 305, the coding device codes the inter prediction filter flag in bitstream data of the current block.

In some examples, for processes of determining and coding an inter prediction filter flag, reference may be made to Embodiment 2, which will not be repeated here.

At step 306, the coding device sends the bitstream data of the current block to a decoding device.

In some examples, in bitstream data of a current block, in addition to an inter prediction filter flag, other contents related to the current block can be included, such as contents related to motion information and contents related to a reconstruction value, which is not limited here.

In some examples, a process flow on a coding device is introduced in the above description, and for a process flow on a decoding device, it can include (not shown in the drawings):

At step 307, after receiving the bitstream data, the decoding device determines the inter prediction filter enable flag indicates whether the current block is allowed to be coded in inter prediction filter mode.

If the inter prediction filter enable flag indicates that the current block is not allowed to be coded in inter prediction filter mode, it is forbidden to parse the inter prediction filter flag of the current block from the bitstream data of the current block, that is, neither inter prediction filter process nor enhanced inter prediction filter process is performed on the current block.

If the inter prediction filter enable flag indicates that the current block is allowed to be coded in inter prediction filter mode, step 308 is performed.

At step 308, the decoding device determines whether the current block satisfies the inter prediction filter conditions.

If the current block does not satisfy the inter prediction filter conditions, it is forbidden to parse the inter prediction filter flag of the current block from the bitstream data of the current block, that is, neither inter prediction filter process nor enhanced inter prediction filter process is performed on the current block.

If the current block satisfies the inter prediction filter conditions, step 309 is performed.

At step 309, the decoding device parses the inter prediction filter flag of the current block from the bitstream data of the current block.

At step 310, the decoding device determines the filter type of the current block according to the inter prediction filter enable flag and the inter prediction filter flag.

In some examples, for a process of determining a filter type, reference may be made to Embodiment 1, which will not be repeated here.

In some examples, if a filter type of a current block is inter prediction filter, step 311 is performed; if the filter type of the current block is enhanced inter prediction filter, step 312 is performed; if the filter type of the current block is no filter, step 313 is performed.

At step 311, the decoding device obtains a target prediction value of the current block by performing an inter prediction filter process on the current block.

At step 312, the decoding device obtains a target prediction value of the current block by performing an enhanced inter prediction filter process on the current block.

In a possible implementation manner, a current block includes a luma component and a chroma component, and a target prediction value of the luma component can be obtained by performing an enhanced inter prediction filter process on the luma component; or a target prediction value of the luma component can be obtained by performing an enhanced inter prediction filter process on the chroma component; or a target prediction value of the luma component can be obtained by performing an enhanced inter prediction filter process on the luma component, and a target prediction value of the chroma component can be obtained by performing an enhanced inter prediction filter process on the chroma component.

At step 313, the decoding device does not perform a filter process on the current block, and determines an inter prediction value of the current block as a target prediction value of the current block.

Based on step 311, or step 312, or step 313, the decoding device can obtain the target prediction value of the current block, and can determine a reconstruction value of the current block based on the target prediction value of the current block, which is not limited here.

In addition, in the above solution, enhanced inter prediction filter can be used to process chroma components, that is, enhanced inter prediction filter is used to process luma components and chroma components, so as to eliminate a discontinuity problem in a space domain between a prediction block and surrounding pixels caused by inter prediction, for example, eliminate a discontinuity problem in a space domain in chroma components, and improve coding performance.

In the embodiments of the present application, enhanced inter prediction filter can support chroma components. For example, for chroma components that satisfy enhanced inter prediction filter conditions, an enhanced inter prediction filter technology can be used to process the chroma components.

In some examples, for a coding device, if an inter prediction filter enable flag (which is subsequently denoted as interpf_enable_flag, or udip_enable_flag) indicates that a current block is allowed to be coded in inter prediction filter mode, and the current block satisfies inter prediction filter conditions, the coding device can select a filter type from no filter, inter prediction filter, and enhanced inter prediction filter by means of RDO, and code an inter prediction filter flag corresponding to the filter type, that is, the inter prediction filter flag is carried in bitstream data.

In some examples, for a decoding device, if an inter prediction filter enable flag indicates that a current block is allowed to be coded in inter prediction filter mode, and the current block satisfies inter prediction filter conditions, the decoding device can parse an inter prediction filter flag of the current block from bitstream data of the current block, and determine a filter type of the current block according to the inter prediction filter flag. If the filter type is the inter prediction filter, the decoding device obtains a target prediction value by performing an inter prediction filter process on the current block. If the filter type is enhanced inter prediction filter, the decoding device obtains a target prediction value by performing an enhanced inter prediction filter process on the current block. If the filter type is no filter, the decoding device does not perform a filter process on the current block, and determines an inter prediction value of the current block as a target prediction value.

Embodiment 5: enhanced inter prediction filter supports chroma components. For example, an enhanced inter prediction filter process can be performed on all chroma components, and an enhanced inter prediction filter process can be performed on chroma components that satisfy enhanced inter prediction filter conditions.

In Embodiment 5, a coding device can acquire an inter prediction filter enable flag (interpf_enable_flag). The coding device can send the inter prediction filter enable flag to a decoding device through bitstream data, so that the decoding device can acquire the inter prediction filter enable flag. Based on this, it can be controlled whether inter prediction filter and enhanced inter prediction filter are enabled through the inter prediction filter enable flag. For example, when the inter prediction filter enable flag takes a value of A (such as 1), it can be controlled that the inter prediction filter and the enhanced inter prediction filter are enabled. When the inter prediction filter enable flag takes a value of B (such as 0), it can be controlled that the inter prediction filter and the enhanced inter prediction filter are disabled. In subsequent embodiments, the value of A being 1 and the value of B being 0 can be taken as an example for description.

For the coding device, the value of interpf_enable_flag can be first determined. If the value of interpf_enable_flag is 1, a current block is allowed to be coded in inter prediction filter mode and the enhanced inter prediction filter mode. If the value of interpf_enable_flag is 0, the current block is not allowed to be coded in inter prediction filter mode and enhanced inter prediction filter mode. Further, if the current block is allowed to be coded in inter prediction filter mode and enhanced inter prediction filter mode, the coding device can determine whether the current block satisfies inter prediction filter conditions.

If the current block satisfies the inter prediction filter conditions, the coding device can select a filter type from no filter, inter prediction filter and enhanced inter prediction filter by means of RDO, use the filter type as a filter type of the current block, and code an inter prediction filter flag corresponding to the filter type, that is, the inter prediction filter flag is carried in the bitstream data.

In some examples, when a coding device selects a filter type from no filter, inter prediction filter and enhanced inter prediction filter by means of RDO, the following manner can be used: the coding device obtains a first target prediction value of the current block by performing an inter prediction filter process on a current block; the coding device obtains a second target prediction value of the current block by performing an enhanced inter prediction filter process on the current block; the coding device does not perform a filter process on the current block, and determines an inter prediction value of the current block as a third target prediction value of the current block. If a rate-distortion cost value corresponding to the first target prediction value is a smallest rate-distortion cost value, it can be determined that the filter type is the inter prediction filter. If a rate-distortion cost value corresponding to the second target prediction value is a smallest rate-distortion cost value, it can be determined that the filter type is the enhanced inter prediction filter. If a rate-distortion cost value corresponding to the third target prediction value is a smallest rate-distortion cost value, it can be determined that the filter type is no filter.

When the coding device obtains the first target prediction value of the current block by performing the inter prediction filter process on the current block, the coding device can obtain a first target prediction value of the luma component by performing an inter prediction filter process on a luma component of the current block, and obtain a first target prediction value of the chroma component by performing an inter prediction filter process on a chroma component of the current block.

When the coding device obtains the second target prediction value of the current block by performing the enhanced inter prediction filter process on the current block, the coding device can obtain a second target prediction value of the luma component by performing an enhanced inter prediction filter process on a luma component of the current block, and obtain a second target prediction value of the chroma component by performing an enhanced inter prediction filter process on a chroma component of the current block.

When the coding device performs the enhanced inter prediction filter process on the chroma component of the current block, the coding device can first determine whether the chroma component satisfies enhanced inter prediction filter conditions. If the chroma component satisfies the enhanced inter prediction filter conditions, the coding device obtains the second target prediction value of the chroma component by performing the enhanced inter prediction filter process on the chroma component.

In some examples, when a coding device codes an inter prediction filter flag corresponding to a filter type, as shown in Table 1, if a filter type of a current block is no filter, a first bit of the inter prediction filter flag is coded to be 0; if the filter type of the current block is inter prediction filter or enhanced inter prediction filter, the first bit of the inter prediction filter flag is coded to be 1; if the filter type of the current block is the inter prediction filter, a second bit of the inter prediction filter flag is coded to be 0; and if the filter type of the current block is the enhanced inter prediction filter, the second bit of the inter prediction filter flag is coded to be 1.

TABLE 1

| Filter manner indexes | Filter types | Inter prediction filter flags |
|---|---|---|
| 0 | No filter | 0 |
| 1 | Inter prediction filter (interpf) | 10 |
| 2 | Enhanced inter prediction filter (enhance interpf) | 11 |

As can be seen from Table 1, if the filter type of the current block is no filter, the inter prediction filter flag is 0, and a filter manner index corresponding to the "no filter" is 0; if the filter type of the current block is the inter prediction filter, the inter prediction filter flag is 10, and a filter manner index corresponding to the "inter prediction filter" is 1; if the filter type of the current block is the enhanced inter prediction filter, the inter prediction filter flag is 11, and a filter manner index corresponding to the "enhanced inter prediction filter" is 2.

For the decoding device, the value of interpf_enable_flag is parsed from the bitstream data. If the value of interpf_enable_flag is 1, the current block is allowed to be coded in inter prediction filter mode and enhanced inter prediction filter mode. If the value of interpf_enable_flag is 0, the current block is not allowed to be coded in inter prediction filter mode and enhanced inter prediction filter mode. Further, if the current block is allowed to be coded in inter prediction filter mode and enhanced inter prediction filter mode, the decoding device can determine whether the current block satisfies the inter prediction filter conditions. If the current block satisfies the inter prediction filter conditions, the decoding device can parse the inter prediction filter flag of the current block from the bitstream data of the current block, and determine the filter type of the current block according to the inter prediction filter flag.

For example, as shown in Table 1, the decoding device decodes the first bit of the inter prediction filter flag. If the first bit is 0, that is, the inter prediction filter flag is 0, it is determined that the filter type of the current block is no filter. If the first bit is not 0 (the first bit is 1), the second bit of the inter prediction filter flag is decoded. If the second bit is 0, that is, the inter prediction filter flag is 10, it is determined that the filter type of the current block is the inter prediction filter. If the second bit is not 0 (the second bit is 1), that is, the inter prediction filter flag is 11, it is determined that the filter type of the current block is the enhanced inter prediction filter.

As can be seen from Table 1, if the inter prediction filter flag is 0, it is determined that the filter manner index is 0, and the filter type corresponding to the filter manner index 0 is no filter. If the inter prediction filter flag is 10, it is determined that the filter manner index is 1, and the filter type corresponding to the filter manner index 1 is the inter prediction filter. If the inter prediction filter flag is 11, it is determined that the filter manner index is 2, and the filter type corresponding to the filter manner index 2 is the enhanced inter prediction filter.

If a filter type of a current block is no filter, a decoding device cannot perform a filter process on the current block, and determine an inter prediction value of the current block as a target prediction value. If the filter type of the current block is inter prediction filter, the decoding device can obtain a target prediction value of the current block by performing an inter prediction filter process on the current block. If the filter type of the current block is enhanced inter prediction filter, the decoding device can obtain a target prediction value of the current block by performing an enhanced inter prediction filter process on the current block.

When the decoding device obtains the target prediction value of the current block by performing the inter prediction filter process on the current block, the decoding device can obtain a target prediction value of the luma component by performing an inter prediction filter process on a luma component of the current block, and obtain a target prediction value of the chroma component by performing an inter prediction filter process on a chroma component of the current block.

When the decoding device obtains the target prediction value of the current block by performing the enhanced inter prediction filter process on the current block, the decoding device can obtain a target prediction value of the luma component by performing an enhanced inter prediction filter process on a luma component of the current block, and obtain a target prediction value of the chroma component by performing an enhanced inter prediction filter process on a chroma component of the current block.

When the decoding device performs the enhanced inter prediction filter process on the chroma component of the current block, the decoding device can first determine whether the chroma component satisfies enhanced inter prediction filter conditions. If the chroma component satisfies the enhanced inter prediction filter conditions, the decoding device obtains the target prediction value of the chroma component by performing the enhanced inter prediction filter process on the chroma component.

In the above embodiment, for the coding device and the decoding device, the inter prediction filter conditions satisfied by the current block can include, but are not limited to, the current block is coded in a direct mode (neither a skip mode nor a regular inter mode), and the current block is not coded in a UMVE mode or an affine mode, and the current block satisfies a size restriction condition.

In the above embodiment, for the coding device and the decoding device, the enhanced inter prediction filter process can be performed on all chroma components, and the enhanced inter prediction filter process can be performed on chroma components that satisfy the enhanced inter prediction filter conditions. For example, when a chroma component belongs to the same partition tree type as a luma component, the chroma component satisfies the enhanced inter prediction filter conditions.

Embodiment 6: in any one of Embodiments 1-5, a coding/decoding device is/are involved in obtaining a target prediction value of the current block by performing an inter prediction filter process on a current block. A process of implementing inter prediction filter (interpf) will be described below. The inter prediction filter can be applied to a direct mode. In the direct mode, an inter prediction value is acquired, and an intra prediction mode is used to acquire an intra prediction value. Finally, the inter prediction value and the intra prediction value are weighted to acquire a final target prediction value. The inter prediction filter can eliminate a discontinuity problem in a space domain between a prediction block and surrounding pixels caused by inter prediction.

Figure 4:
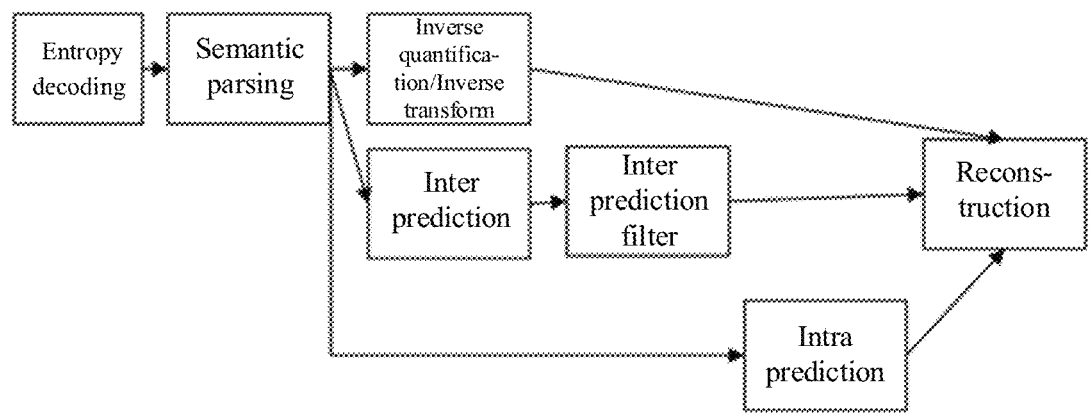
FIG. 4 is a diagram illustrating a decoding process including inter prediction filter in an embodiment of the present application.

FIG. 4 is a diagram illustrating a decoding process including inter prediction filter. Here, a decoding process on a decoding device is taken as an example for description, and a coding process on a coding device is similar to this. The inter prediction filter is performed between an inter prediction process and a reconstruction process. The inter prediction filter is mainly used for a current block in a direct mode (neither a skip mode nor a regular inter mode), and the current block is not coed in a UMVE mode or the current block is not coded in an affine mode.

If the inter prediction filter is to be used for the current block, an inter prediction mode can be first used to acquire an inter prediction value of the current block, and an intra prediction mode can be used to acquire an intra prediction value of the current block. Then, a target prediction value of the current block is determined according to the inter prediction value and the intra prediction value. The reconstruction process is completed based on the target prediction value of the current block. If the inter prediction filter is not to be used for the current block, an inter prediction mode can be first used to acquire an inter prediction value of the current block. Then, the inter prediction value of the current block is determined as a target prediction value of the current block. The reconstruction process is completed based on the target prediction value of the current block.

In some examples, for each pixel position of a current block, an inter prediction mode can be used to obtain an inter prediction value at the pixel position, an intra prediction mode (such as a Plane mode, a DC mode, or an arbitrary angle mode, which is not limited here) can be used to obtain an intra prediction value at the pixel position, and the inter prediction value at the pixel position and the intra prediction value at the pixel position are weighted to obtain a target prediction value at the pixel position. Then, target prediction values at all pixel positions of the current block are combined to obtain a target prediction value of the current block.

In a possible implementation manner, for each pixel position of a current block, assuming that a Plane mode is used to obtain an intra prediction value at the pixel position, the following formulas can be used to obtain the intra prediction value at the pixel position:

$$\text{Pred\_Q}(x, y) = (\text{Pred\_V}(x, y) + \text{Pred\_H}(x, y) + 1) \gg 2,$$

$$\text{Pred\_V}(x, y) =$$
$$((h - 1 - y) * \text{Recon}(x, -1) + (y + 1) * \text{Recon}(1 -, h) + (h \gg 1)) \gg \log2(h), \text{ and}$$

$$\text{Pred\_H}(x, y) =$$
$$((w - 1 - x) * \text{Recon}(-1, y) + (x + 1) * \text{Recon}(w, -1) + (w \gg 1)) \gg \log2(w),$$

where Pred_Q(x,y) represents an intra prediction value at a pixel position (x,y), w and h are a width and a height of a current block, x and y are relative coordinates of the current block, and Recon(x,y) is a reconstructed pixel value around the current block.

In a possible implementation manner, for each pixel position of a current block, 5:3 weighting is performed based on an inter prediction value (Pred_inter) and an intra prediction value (Pred_Q) to obtain a target prediction value at the pixel position. 5:3 is just an example. Other weighting factors can be used. For example, the following formula can be used to obtain the target prediction value at the pixel position:

$$\text{Pred}(x, y) = (\text{Pred\_inter}(x, y) * 5 + \text{Pred\_Q}(x, y) * 3 + 4) \gg 3,$$

where Pred(x,y) can represent a target prediction value at a pixel position (x,y), Pred_inter(x,y) can represent an inter prediction value at a pixel position (x,y), and Pred_Q(x,y) can represent an intra prediction value at a pixel position (x,y).

Embodiment 7: in any one of Embodiments 1-5, a coding/decoding device is involved in obtaining a target prediction value of the current block by performing an enhanced inter prediction filter process on a current block. A process of implementing enhanced inter prediction filter (enhance interpf) will be described below. When the enhanced inter prediction filter process is performed on the current block, an inter prediction value of the current block and a reconstruction value of reconstructed pixels adjacent to the current block (such as a reconstruction value of reconstructed pixels in a left column outside the current block, and/or a reconstruction value of reconstructed pixels in an upper row outside the current block) can be acquired, and the target prediction value of the current block is determined according to the inter prediction value and the reconstruction value.

The enhanced inter prediction filter is derived from Intra Prediction Filter (IPF). By introducing the IPF into inter prediction filter, the enhanced inter prediction filter process can be performed on the current block, so that noise and discontinuity after motion compensation can be more effectively removed. Since the enhanced inter prediction filter is derived from the IPF, contents related to the IPF will be introduced first. The IPF can use 1 bit to indicate whether the current block is allowed to be coded in an IPF mode, and it can be determined whether the current block is to be coded in the IPF mode in an RDO stage. In addition, an IPF technology is to select reference pixels according to an intra prediction mode of the current block, which can include the following three cases.

Case 1: for a DC mode, a Plane mode, and a Bilinear mode, reconstructed pixels in a left column and reconstructed pixels in an upper row are used as reference pixels, and a 3-tap filter is used. For example, the following formula can be used to perform an IPF process:

$$P'(x, y) = f(x) \cdot P(-1, y) + f(y) \cdot P(x, -1) + (1 - f(x) - f(y)) \cdot P(x, y),$$

where 0≤x, y<N, P'(x,y) is an intra prediction value after filtering, P(x,y) is an intra prediction value obtained by using a conventional intra prediction mode, f(x) and f(y) are filter coefficients, and N is a size of a current block.

Case 2: for a vertical prediction mode in a High-Performance Model (HPM) (such as modes 3~18), reconstructed pixels in a left column are used as reference pixels, and a 2-tap filter is used. For example, the following formula can be used to perform an IPF process:

$$P'(x, y) = f(x) \cdot P(-1, y) + (1 - f(x)) \cdot P(x, y),$$

where x<N, P'(x,y) can be an intra prediction value after filtering, P(x,y) can be an intra prediction value obtained by using a conventional intra prediction mode, f(x) and f(y) can be filter coefficients, and N is a size of a current block.

Case 3: for a horizontal prediction mode in an HPM (such as modes 19~32), reconstructed pixels in an upper row are used as reference pixels, and a 2-tap filter is used. For example, the following formula can be used to perform an IPF process:

$$P'(x, y) = f(y) \cdot P(x, -1) + (1 - f(y)) \cdot P(x, y)$$

where y<N, P'(x,y) can be an intra prediction value after filtering, P(x,y) can be an intra prediction value obtained by using a conventional intra prediction mode, f(x) and f(y) can be filter coefficients, and N is a size of a current block.

In some examples, for Case 1, Case 2, and Case 3, in order to avoid floating-point calculation, filter coefficients can be subjected to a fixed-point process. For example, the IPF formula for Case 1 can be replaced with the following formula. In the following formula, F(x) and F(y) are coefficients after a fixed-point process, that is, f(x) and f(y) are converted into F(x) and F(y). Case 2 and Case 3 are similar to this, which will not be repeated here.

$$p'(x) = (F(x) \cdot p(-1, y) + F(y) \cdot p(x, -1) + (64 - F(x) - F(y)) \cdot p(x) + 32) \gg 6$$

In some examples, F(x) and F(y) can be filter coefficients (that is, filter coefficients after amplification). Table 2 shows an example of filter coefficients, and the filter coefficients are related to both block sizes and distances from reference pixels. In Table 2, a size of a prediction block represents a width or a height of a current block, and a distance from reference pixels represents a prediction distance. In Table 2, a maximum prediction distance is set to be 10. In practical applications, the maximum prediction distance can be larger, which is not limited here.

TABLE 2

|  |  | Sizes of prediction blocks | | | | |
| --- | --- | --- | --- | --- | --- | --- |
|  |  | 4 | 8 | 16 | 32 | 64 |
| Distances from reference pixels | 1 | 24 | 44 | 40 | 36 | 52 |
|  | 2 | 6 | 25 | 27 | 27 | 44 |
|  | 3 | 2 | 14 | 19 | 21 | 37 |
|  | 4 | 0 | 8 | 13 | 16 | 31 |
|  | 5 | 0 | 4 | 9 | 12 | 26 |
|  | 6 | 0 | 2 | 6 | 9 | 22 |
|  | 7 | 0 | 1 | 4 | 7 | 18 |
|  | 8 | 0 | 1 | 3 | 5 | 15 |
|  | 9 | 0 | 0 | 2 | 4 | 13 |
|  | 10 | 0 | 0 | 1 | 3 | 11 |

Figure 5:
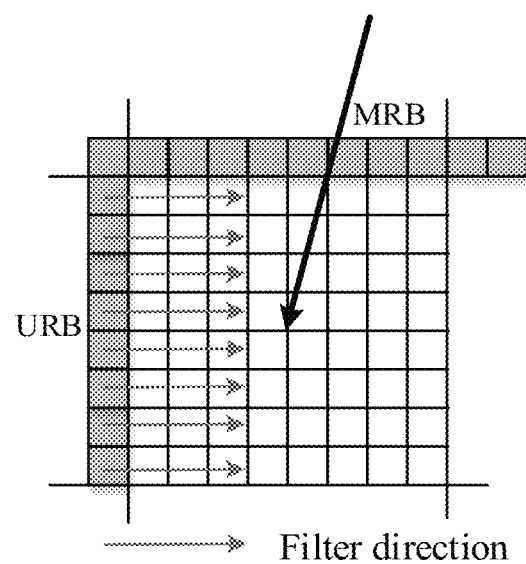
FIG. 5 is a diagram illustrating a position relationship between a current block and reference pixels in an embodiment of the present application.

For example, as shown in FIG. 5, or a pixel position A in a first row and third column of a current block, assuming that reference pixels are reconstructed pixels in a left column, a distance between the pixel position A and the reference pixels is 3; assuming that a size of the current block is 4*4, a filter coefficient is 2; assuming that the size of the current block is 8*8, the filter coefficient is 14; assuming that the size of the current block is 16*16, the filter coefficient is 19; assuming that the size of the current block is 32*32, the filter coefficient is 21; and so on. For other pixel positions, a method for determining filter coefficients is similar to that for the pixel position A, which will not be repeated here.

In some examples, by introducing IPF into inter prediction filter, enhanced inter prediction filter can be performed on a current block, that is, a new filter method, i.e., the enhanced inter prediction filter, is added to the inter prediction filter. The enhanced inter prediction filter can improve coding performance without changing complexity of coding and decoding. An inter prediction filter flag can be used to indicate whether to use the enhanced inter prediction filter, and then an index flag is to be used to indicate a selected filter type.

FIG. 4 is a diagram illustrating a decoding process including enhanced inter prediction filter. Here, a decoding process on a decoding device is taken as an example for description, and a coding process on a coding device is similar to this. The enhanced inter prediction filter is performed between an inter prediction process and a reconstruction process. The enhanced inter prediction filter is mainly used for a current block in a direct mode (neither a skip mode nor a regular inter mode), and the current block is not coded in a UMVE mode or an affine mode.

If the enhanced inter prediction filter is to be used for the current block, an inter prediction mode can be first used to acquire an inter prediction value of the current block, and a reconstruction value of reconstructed pixels adjacent to the current block (such as a reconstruction value of reconstructed pixels in a left column outside the current block, and/or a reconstruction value of reconstructed pixels in an upper row outside the current block) can be acquired. Then, a target prediction value of the current block is determined according to the inter prediction value and the reconstruction value. The reconstruction process is completed based on the target prediction value of the current block. For example, the formula in Case 3 can be used, and implementation principles are similar, which is not limited here.

In some examples, Embodiments 1-7 can be implemented alone or in combination. For example, Embodiments 1 and 2 can be implemented in combination. Embodiments 1 and 3 can be implemented in combination. Embodiments 2 and 3 can be implemented in combination. Embodiments 3 and 5 can be implemented in combination. Embodiment 1 and Embodiments 6, 7 can be implemented in combination. The above are just several examples, and combinations between the embodiments are not limited here.

Figure 6A:
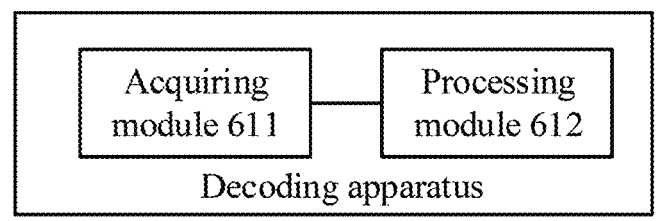
FIG. 6A is a structure diagram illustrating a decoding apparatus in an embodiment of the present application.

Based on the same application concept as the above methods, in the embodiments of the present application, there is provided a decoding apparatus, which is applied to a decoding device. FIG. 6A is a structure diagram illustrating a decoding apparatus. The apparatus includes: an acquiring module 611, configured to, if an inter prediction filter enable flag indicates that a current block is allowed to be coded in inter prediction filter mode, and the current block satisfies inter prediction filter conditions, parse an inter prediction filter flag of the current block from bitstream data of the current block; a processing module 612, configured to, if the inter prediction filter flag indicates that a filter type of the current block is the inter prediction filter, obtain a target prediction value of the current block by performing an inter prediction filter process on the current block, and if the inter prediction filter flag indicates that the filter type of the current block is enhanced inter prediction filter, obtain a target prediction value of the current block by performing an enhanced inter prediction filter process on the current block.

The acquiring module 611 is further configured to parse the inter prediction filter enable flag from the bitstream data, where the inter prediction filter enable flag indicates that the current block is allowed to be coded in inter prediction filter mode, or the current block is not allowed to be coded in inter prediction filter mode.

In some examples, if an inter prediction filter enable flag indicates that a current block is allowed to be coded in inter prediction filter mode, when an inter prediction filter flag takes a first value, the inter prediction filter flag indicates that a filter type of the current block is no filter; when the inter prediction filter flag takes a second value, the inter prediction filter flag indicates that the filter type of the current block is the inter prediction filter; when the inter prediction filter flag takes a third value, the inter prediction filter flag indicates that the filter type of the current block is enhanced inter prediction filter.

The current block includes a luma component and a chroma component. The processing module 612, when obtaining the target prediction value of the current block by performing the enhanced inter prediction filter process on the current block, is further configured to: obtain a target prediction value of the luma component by performing an enhanced inter prediction filter process on the luma component; or obtain a target prediction value of the chroma component by performing an enhanced inter prediction filter process on the chroma component; or obtain a target prediction value of the luma component by performing an enhanced inter prediction filter process on the luma component, and obtaining a target prediction value of the chroma component by performing an enhanced inter prediction filter process on the chroma component.

The processing module 612, when obtaining the target prediction value of the chroma component by performing the enhanced inter prediction filter process on the chroma component, is further configured to: acquire an inter prediction value of the chroma component and a chroma reconstruction value of reconstructed pixels adjacent to the chroma component; and determine the target prediction value of the chroma component according to the inter prediction value of the chroma component and the chroma reconstruction value.

Figure 6B:
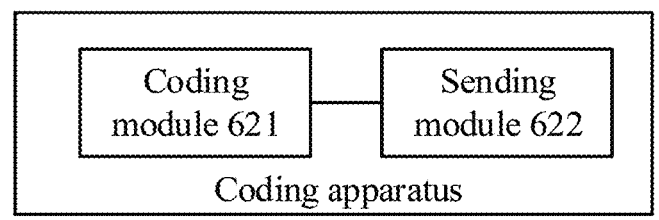
FIG. 6B is a structure diagram illustrating a coding apparatus in an embodiment of the present application.

Based on the same application concept as the above methods, in the embodiments of the present application, there is provided a coding apparatus, which is applied to a coding device. FIG. 6B is a structure diagram illustrating a coding apparatus. The apparatus includes: a coding module 621, configured to, if an inter prediction filter enable flag indicates that a current block is allowed to be coded in inter prediction filter mode, and the current block satisfies inter prediction filter conditions, code an inter prediction filter flag of the current block in bitstream data of the current block according to a filter type of the current block, where if the filter type of the current block is the inter prediction filter, the inter prediction filter flag indicates that the filter type of the current block is the inter prediction filter, or if the filter type of the current block is enhanced inter prediction filter, the inter prediction filter flag indicates that the filter type of the current block is the enhanced inter prediction filter; a sending module 622, configured to send the bitstream data of the current block.

The coding module 621 is further configured to code the inter prediction filter enable flag in the bitstream data, where the inter prediction filter enable flag indicates that the current block is allowed to be coded in inter prediction filter mode, or the current block is not allowed to be coded in inter prediction filter mode.

The coding module 621, when coding the inter prediction filter flag of the current block in the bitstream data of the current block according to the filter type of the current block, is further configured to: if the inter prediction filter enable flag indicates that the current block is allowed to be coded in inter prediction filter mode, when the filter type of the current block is no filter, code the inter prediction filter flag as a first value in the bitstream data of the current block; when the filter type of the current block is the inter prediction filter, code the inter prediction filter flag as a second value in the bitstream data of the current block; when the filter type of the current block is the enhanced inter prediction filter, code the inter prediction filter flag as a third value in the bitstream data of the current block.

The coding module 621 is further configured to: obtain a first target prediction value of the current block by performing an inter prediction filter process on the current block; obtaining a second target prediction value of the current block by performing an enhanced inter prediction filter process on the current block; determine an inter prediction value of the current block as a third target prediction value of the current block without performing a filter process on the current block; determine the filter type of the current block according to a rate-distortion cost value corresponding to the first target prediction value, a rate-distortion cost value corresponding to the second target prediction value, and a rate-distortion cost value corresponding to the third target prediction value.

The current block includes a luma component and a chroma component. The coding module 621, when obtaining the second target prediction value of the current block by performing the enhanced inter prediction filter process on the current block, is further configured to: obtain a second target prediction value of the luma component by performing an enhanced inter prediction filter process on the luma component; or obtain a second target prediction value of the chroma component by performing an enhanced inter prediction filter process on the chroma component; or obtain a second target prediction value of the luma component by performing an enhanced inter prediction filter process on the luma component, and obtain a second target prediction value of the chroma component by performing an enhanced inter prediction filter process on the chroma component.

The coding module 621, when obtaining the second target prediction value of the chroma component by performing the enhanced inter prediction filter process on the chroma component, is further configured to: acquire an inter prediction value of the chroma component and a chroma reconstruction value of reconstructed pixels adjacent to the chroma component; and determine the second target prediction value of the chroma component according to the inter prediction value of the chroma component and the chroma reconstruction value.

Figure 6C:
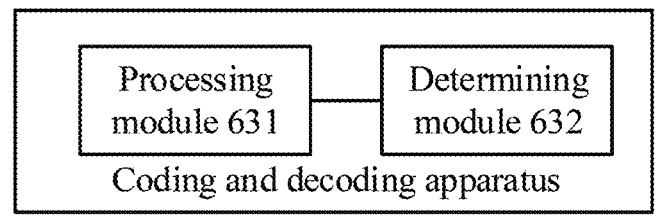
FIG. 6C is a structure diagram illustrating a coding and decoding apparatus in an embodiment of the present application.

Based on the same application concept as the above methods, in the embodiments of the present application, there is provided a coding and decoding apparatus, which is applied to a decoding device or a coding device. FIG. 6C is a structure diagram illustrating a coding and decoding apparatus. The apparatus includes: a processing module 631, configured to, if it is determined that enhanced inter prediction filter is enabled for a current block, obtain a target prediction value of the chroma component by performing an enhanced inter prediction filter process on a chroma component of the current block; a determining module 632, configured to, determine a target prediction value of the current block according to the target prediction value of the chroma component.

The processing module 631 is further configured to: if the chroma component of the current block satisfies enhanced inter prediction filter conditions, obtain the target prediction value of the chroma component by performing the enhanced inter prediction filter process on the chroma component, where the chroma component satisfies the enhanced inter prediction filter conditions, which includes, but is not limited to, the chroma component of the current block belongs to a same partition tree type as a luma component of the current block.

The processing module 631 is further configured to: acquire an inter prediction value of the chroma component and a chroma reconstruction value of reconstructed pixels adjacent to the chroma component; and determine the target prediction value of the chroma component according to the inter prediction value of the chroma component and the chroma reconstruction value.

The processing module 631 is further configured to: obtain a target prediction value of the luma component by performing an enhanced inter prediction filter process on the luma component of the current block; the determining module 632 is further configured to: determine the target prediction value of the current block according to the target prediction value of the chroma component and the target prediction value of the luma component.

Figure 7A:
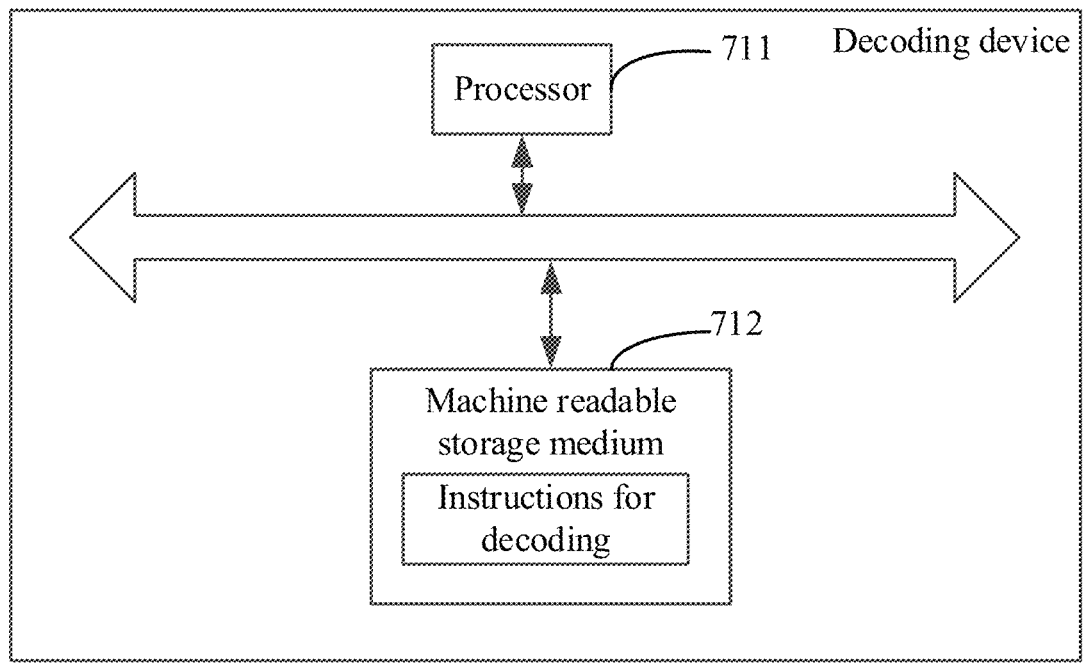
FIG. 7A is a hardware structure diagram illustrating a decoding device in an embodiment of the present application.

In the embodiments of the present application, there is provided a decoding device (in some examples, the decoding device may be a video decoding device). From a hardware level, a hardware structure diagram of the decoding device can be specifically shown in FIG. 7A, including a processor 711 and a machine readable storage medium 712. The machine readable storage medium 712 stores machine executable instructions that can be executed by the processor 711. The processor 711 is configured to execute the machine executable instructions to implement the methods disclosed in the above embodiments of the present application. For example, the processor is used to execute machine executable instructions to implement the following steps: if an inter prediction filter enable flag indicates that a current block is allowed to be coded in inter prediction filter mode, and the current block satisfies inter prediction filter conditions, parsing an inter prediction filter flag of the current block from bitstream data of the current block; if the inter prediction filter flag indicates that a filter type of the current block is the inter prediction filter, obtaining a target prediction value of the current block by performing an inter prediction filter process on the current block; if the inter prediction filter flag indicates that the filter type of the current block is enhanced inter prediction filter, obtain a target prediction value of the current block by performing an enhanced inter prediction filter process on the current block.

Alternatively, the processor is used to execute machine executable instructions to implement the following steps: if it is determined that enhanced inter prediction filter is enabled for a current block, obtaining a target prediction value of the chroma component by performing an enhanced inter prediction filter process on a chroma component of the current block; and determining a target prediction value of the current block according to the target prediction value of the chroma component.

Figure 7B:
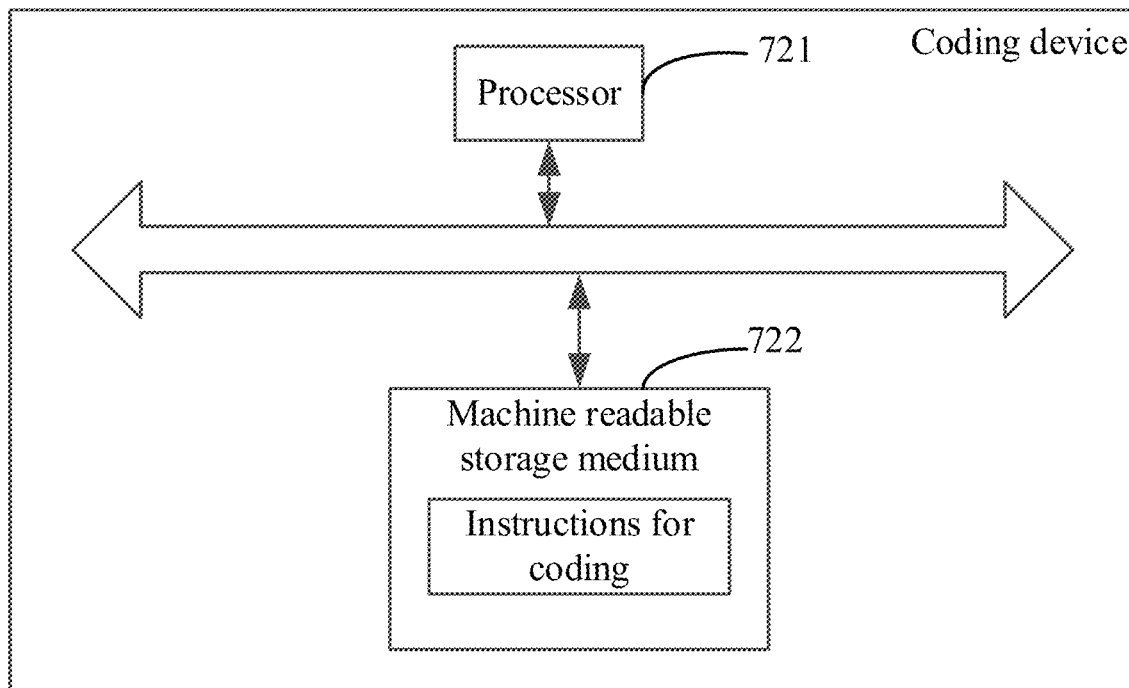
FIG. 7B is a hardware structure diagram illustrating a coding device in an embodiment of the present application.

In the embodiments of the present application, there is provided a coding device (in some examples, the coding device may be a video coding device). From a hardware level, a hardware structure diagram of the coding device can be specifically shown in FIG. 7B, including a processor 721 and a machine readable storage medium 722. The machine readable storage medium 722 stores machine executable instructions that can be executed by the processor 721. The processor 721 is configured to execute the machine executable instructions to implement the methods disclosed in the above embodiments of the present application. For example, the processor is used to execute machine executable instructions to implement the following steps: if an inter prediction filter enable flag indicates that a current block is allowed to be coded in inter prediction filter mode, and the current block satisfies inter prediction filter conditions, coding an inter prediction filter flag of the current block in bitstream data of the current block according to a filter type of the current block, where if the filter type of the current block is the inter prediction filter, the inter prediction filter flag indicates that the filter type of the current block is the inter prediction filter; or if the filter type of the current block is enhanced inter prediction filter, the inter prediction filter flag indicates that the filter type of the current block is the enhanced inter prediction filter. Alternatively, the processor is used to execute machine executable instructions to implement the following steps: if it is determined that enhanced inter prediction filter is enabled for a current block, obtaining a target prediction value of the chroma component by performing an enhanced inter prediction filter process on a chroma component of the current block; and determining a target prediction value of the current block according to the target prediction value of the chroma component.

Based on the same application concept as the above methods, in the embodiments of the present application, there is further provided a camera device. The camera device can include the coding apparatus and/or the decoding apparatus in any one of the above embodiments.

Based on the same application concept as the above methods, in the embodiments of the present application, there is further provided a machine readable storage medium. Several computer instructions are stored on the machine readable storage medium. When the computer instructions are executed by a processor, the decoding method, or the coding method, or the coding and decoding method disclosed in the above embodiments of the present application can be implemented, which is not limited here.

The system, apparatus, module or unit set forth in the above embodiments may be implemented by a computer chip or an entity, or by a product having a certain function. A typical implementation device is a computer, and a specific form of the computer may be a personal computer, a laptop computer, a cellular phone, a camera phone, a smart phone, a personal digital assistant, a media player, a navigation device, an e-mail transceiver device, a tablet computer, a wearable device, or a combination of any of these devices.

For convenience of description, when the above devices are described, various units divided based on functions are described separately. When the present application is implemented, functions of each unit may be implemented in one or more software and/or hardware.

Those skilled in the art should understand that the embodiments of the present application may be provided as methods, systems, or computer program products. The present application may take the form of entirely hardware embodiments, entirely software embodiments, or embodiments combining software and hardware aspects. Furthermore, the embodiments of the present application may take the form of a computer program product implemented on one or more computer usable storage media (including, but not limited to, disk storage, CD-ROM, optical storage, etc.) having computer usable program codes therein.

The above are only embodiments of the present application, which are not intended to limit the present application. For those skilled in the art, the present application can have various modifications and variations. Any modification, equivalent replacement, improvement, etc. made within the spirit and principle of the application shall be included within the scope of the claims of the application.

The invention claimed is:

1. A decoding method, performed by a decoding device, the decoding method comprising:
   if an inter prediction filter enable flag indicates that a current block is allowed to be coded in an inter prediction filter mode, and the current block satisfies inter prediction filter conditions, parsing an inter prediction filter flag of the current block from bitstream data of the current block;
   if the inter prediction filter flag indicates that a filter type of the current block is an inter prediction filter, obtaining a first target prediction value of the current block by performing an inter prediction filter process on the current block; and
   if the inter prediction filter flag indicates that the filter type of the current block is an enhanced inter prediction filter, obtaining a second target prediction value of the current block by performing an enhanced inter prediction filter process on the current block,
   wherein the enhanced inter prediction filter refers to, in an inter prediction process, using an inter prediction mode to acquire an inter prediction value of the current block, acquiring a reconstruction value of reconstructed pixels adjacent to the current block, and determining a target prediction value of the current block according to the inter prediction value and the reconstruction value,
   wherein the current block comprises a chroma component, and obtaining the target prediction value of the current block by performing the enhanced inter prediction filter process on the current block comprises: obtaining a target prediction value of the chroma component by performing the enhanced inter prediction filter process on the chroma component,
   wherein obtaining the target prediction value of the chroma component by performing the enhanced inter prediction filter process on the chroma component comprises:
     if the chroma component satisfies enhanced inter prediction filter conditions, obtaining the target prediction value of the chroma component by performing the enhanced inter prediction filter process on the chroma component, wherein the chroma component satisfies the enhanced inter prediction filter conditions, which comprises: the chroma component belongs to a same partition tree type as a luma component of the current block, and
   wherein the chroma component belongs to the same partition tree type as the luma component of the current block, which comprises: the current block does not satisfy any one of:
     the current block is of a Quad-tree (QT) partition type, and a width or a height of the current block is equal to 8,
     the current block is of a vertical Binary-tree (BT_VER) partition type, and the width of the current block is equal to 8,
     the current block is of a horizontal Binary-tree (BT_HOR) partition type, and the height of the current block is equal to 8,
     the current block is of a vertical Extended Quad-tree (EQT_VER) partition type, and the width of the current block is equal to 16,
     the current block is of a vertical Extended Quad-tree (EQT_VER) partition type, and the height of the current block is equal to 8, the current block is of a horizontal Extended Quad-tree (EQT_HOR) partition type and the height of the current block is equal to 16, and the current block is of a horizontal Extended Quad-tree (EQT_HOR) partition type, and the width of the current block is equal to 8.

2. The method according to claim 1, wherein the current block further comprises the luma component, and obtaining the target prediction value of the current block by performing the enhanced inter prediction filter process on the current block comprises:

obtaining a target prediction value of the luma component by performing the enhanced inter prediction filter process on the luma component;

obtaining a target prediction value of the luma component by performing the enhanced inter prediction filter process on the luma component, and obtaining the target prediction value of the chroma component by performing the enhanced inter prediction filter process on the chroma component.

3. The method according to claim 1, wherein obtaining the target prediction value of the chroma component by performing the enhanced inter prediction filter process on the chroma component comprises:

acquiring an inter prediction value of the chroma component and a chroma reconstruction value of reconstructed pixels adjacent to the chroma component; and determining the target prediction value of the chroma component according to the inter prediction value of the chroma component and the chroma reconstruction value.

4. A decoding device, comprising:

a non-transitory machine readable storage medium storing machine executable instructions; and at least one processor configured to execute the machine executable instructions to implement the method according to claim 1.

5. The decoding device according to claim 4, wherein the current block further comprises the luma component, and when obtaining the target prediction value of the current block by performing the enhanced inter prediction filter process on the current block, the at least one processor is further configured to:

obtain a target prediction value of the luma component by performing the enhanced inter prediction filter process on the luma component;

or obtain a target prediction value of the luma component by performing the enhanced inter prediction filter process on the luma component, and obtaining the target prediction value of the chroma component by performing the enhanced inter prediction filter process on the chroma component.

6. The decoding device according to claim 4, when obtaining the target prediction value of the chroma component by performing the enhanced inter prediction filter process on the chroma component, the at least one processor is further configured to:

acquire an inter prediction value of the chroma component and a chroma reconstruction value of reconstructed pixels adjacent to the chroma component; and determine the target prediction value of the chroma component according to the inter prediction value of the chroma component and the chroma reconstruction value.

7. A non-transitory machine readable storage medium coupled to at least one processor having machine-executable instructions stored thereon that, when executed by the at least one processor, cause the at least one processor to perform the method according to claim 1.

8. A coding method, performed by a coding device, the coding method comprising:

if an inter prediction filter enable flag indicates that a current block is allowed to be coded in an inter prediction filter mode, and the current block satisfies inter prediction filter conditions, coding an inter prediction filter flag of the current block in bitstream data of the current block according to a filter type of the current block, wherein, if the filter type of the current block is an inter prediction filter, the inter prediction filter flag indicates that the filter type of the current block is the inter prediction filter, or if the filter type of the current block is an enhanced inter prediction filter, the inter prediction filter flag indicates that the filter type of the current block is the enhanced inter prediction filter, wherein the enhanced inter prediction filter refers to; in an inter prediction process, using an inter prediction mode to acquire an inter prediction value of the current block, acquiring a reconstruction value of reconstructed pixels adjacent to the current block, and determining a target prediction value of the current block according to the inter prediction value and the reconstruction value, wherein, before coding the inter prediction filter flag of the current block in the bitstream data of the current block according to the filter type of the current block, the method further comprises:

obtaining a first target prediction value of the current block by performing an inter prediction filter process on the current block;

obtaining a second target prediction value of the current block by performing an enhanced inter prediction filter process on the current block;

determining an inter prediction value of the current block as a third target prediction value of the current block without performing a filter process on the current block; and determining the filter type of the current block according to a rate-distortion cost value corresponding to the first target prediction value, a rate-distortion cost value corresponding to the second target prediction value, and a rate-distortion cost value corresponding to the third target prediction value, wherein the current block comprises a chroma component, and obtaining the second target prediction value of the current block by performing the enhanced inter prediction filter process on the current block comprises:

obtaining a second target prediction value of the chroma component by performing the enhanced inter prediction filter process on the chroma component, wherein obtaining the second target prediction value of the chroma component by performing the enhanced inter prediction filter process on the chroma component comprises:

if the chroma component satisfies enhanced inter prediction filter conditions, obtaining the second target prediction value of the chroma component by performing the enhanced inter prediction filter process on the chroma component, wherein the chroma component satisfies the enhanced inter prediction filter conditions, which comprises: the chroma component belongs to a same partition tree type as a luma component of the current block, and wherein the chroma component belongs to the same partition tree type as the luma component of the current block, which comprises: the current block does not satisfy any one of:
the current block is of a Quad-tree (QT) partition type, and a width or a height of the current block is equal to 8,
the current block is of a vertical Binary-tree (BT_VER) partition type, and the width of the current block is equal to 8,
the current block is of a horizontal Binary-tree (BT_HOR) partition type, and the height of the current block is equal to 8,
the current block is of a vertical Extended Quad-tree (EQT_VER) partition type, and the width of the current block is equal to 16,
the current block is of a vertical Extended Quad-tree (EQT_VER) partition type, and the height of the current block is equal to 8,
the current block is of a horizontal Extended Quad-tree (EQT_HOR) partition type, and the height of the current block is equal to 16, and
the current block is of a horizontal Extended Quad-tree (EQT_HOR) partition type, and the width of the current block is equal to 8.

9. The method according to claim 8, wherein the current block further comprises the luma component, and obtaining the second target prediction value of the current block by performing the enhanced inter prediction filter process on the current block comprises:
obtaining a second target prediction value of the luma component by performing the enhanced inter prediction filter process on the luma component; or
obtaining a second target prediction value of the luma component by performing the enhanced inter prediction filter process on the luma component, and obtaining the second target prediction value of the chroma component by performing the enhanced inter prediction filter process on the chroma component.

10. The method according to claim 8, wherein obtaining the second target prediction value of the chroma component by performing the enhanced inter prediction filter process on the chroma component comprises:
acquiring an inter prediction value of the chroma component and a chroma reconstruction value of reconstructed pixels adjacent to the chroma component; and
determining the second target prediction value of the chroma component according to the inter prediction value of the chroma component and the chroma reconstruction value.

11. A coding device, comprising:
a non-transitory machine readable storage medium storing machine executable instructions; and
at least one processor configured to execute the machine executable instructions to implement the method according to claim 8.

12. The coding device according to claim 11, wherein the current block further comprises the luma component, and when obtaining the second target prediction value of the current block by performing the enhanced inter prediction filter process on the current block, the at least one processor is further configured to:
obtain a second target prediction value of the luma component by performing the enhanced inter prediction filter process on the luma component;
or
obtain a second target prediction value of the luma component by performing the enhanced inter prediction filter process on the luma component, and obtaining the second target prediction value of the chroma component by performing the enhanced inter prediction filter process on the chroma component.

13. A non-transitory machine readable storage medium coupled to at least one processor having machine-executable instructions stored thereon that, when executed by the at least one processor, cause the at least one processor to perform the method according to claim 8.

14. A coding and decoding method, performed by a coding device or a decoding device, the coding and decoding method comprising:
if it is determined that an enhanced inter prediction filter is enabled for a current block, obtaining a target prediction value of a chroma component of the current block by performing an enhanced inter prediction filter process on the chroma component of the current block; and
determining a target prediction value of the current block according to the target prediction value of the chroma component,
wherein the enhanced inter prediction filter refers to: in an inter prediction process, using an inter prediction mode to acquire an inter prediction value of the current block, acquiring a reconstruction value of reconstructed pixels adjacent to the current block, and determining a target prediction value of the current block according to the inter prediction value and the reconstruction value,
wherein obtaining the target prediction value of the chroma component by performing the enhanced inter prediction filter process on the chroma component of the current block comprises:
if the chroma component of the current block satisfies enhanced inter prediction filter conditions, obtaining the target prediction value of the chroma component by performing the enhanced inter prediction filter process on the chroma component,
wherein the chroma component satisfies the enhanced inter prediction filter conditions, which comprises: the chroma component belongs to a same partition tree type as a luma component of the current block, and
wherein the chroma component belongs to the same partition tree type as the luma component of the current block, which comprises: the current block does not satisfy any one of:
the current block is of a QT partition type, and a width or a height of the current block is equal to 8,
the current block is of a BT_VER partition type, and the width of the current block is equal to 8,
the current block is of a BT_HOR partition type, and the height of the current block is equal to 8,
the current block is of an EQT_VER partition type, and the width of the current block is equal to 16,
the current block is of an EQT_VER partition type, and the height of the current block is equal to 8,
the current block is of an EQT_HOR partition type, and the height of the current block is equal to 16, and
the current block is of an EQT_HOR partition type, and the width of the current block is equal to 8.

* * * * *